US012264982B2

(12) United States Patent
Fujio et al.

(10) Patent No.: US 12,264,982 B2
(45) Date of Patent: Apr. 1, 2025

(54) LIGHT EMITTING STRUCTURE THAT EMITS LIGHT IN ACCORDANCE WITH LOAD, LOAD MEASURING DEVICE EMPLOYING SAME, AND LOAD DISTRIBUTION MEASURING METHOD

(71) Applicant: NATIONAL INSTITUTE OF ADVANCED INDUSTRIAL SCIENCE AND TECHNOLOGY, Tokyo (JP)

(72) Inventors: Yuki Fujio, Tosu (JP); Kazuma Kurihara, Tsukuba (JP); Kazuya Kikunaga, Tosu (JP); Kengo Manabe, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 198 days.

(21) Appl. No.: 18/245,329

(22) PCT Filed: Oct. 11, 2021

(86) PCT No.: PCT/JP2021/037637
§ 371 (c)(1),
(2) Date: Mar. 14, 2023

(87) PCT Pub. No.: WO2022/080333
PCT Pub. Date: Apr. 21, 2022

(65) Prior Publication Data
US 2023/0384175 A1    Nov. 30, 2023

(30) Foreign Application Priority Data
Oct. 16, 2020 (JP) .................................. 2020-175040

(51) Int. Cl.
*G01L 1/24* (2006.01)

(52) U.S. Cl.
CPC ...................................... *G01L 1/24* (2013.01)

(58) Field of Classification Search
CPC ................................... G01L 1/24; G01L 1/247
See application file for complete search history.

(56) References Cited

U.S. PATENT DOCUMENTS 11,047,750 B2 *  6/2021  Ryu ..................... H10K 85/221
11,945,098 B2 *  4/2024  Redmond ............. G01N 19/02
(Continued)

FOREIGN PATENT DOCUMENTS

| CN | 105865668 A | 8/2016 |
|----|-------------|--------|
| JP | 2005283259 A | 10/2005 |

(Continued)

OTHER PUBLICATIONS

Takahashi, H. et al., "MEMS two-axis force plate array used to measure the ground reaction forces during the running motion of an ant," Journal of Micromechanics and Microengineering, vol. 24, May 14, 2014, 10 pages.

(Continued)

*Primary Examiner* — Freddie Kirkland, III
(74) *Attorney, Agent, or Firm* — McCoy Russell LLP

(57) ABSTRACT

A light emitting structure emits light in response to a load applied to an object from a load object. In the light emitting structure are formed contacting portions which are provided on a supporting surface of the object, and which have a predetermined length from the surface of the supporting surface in a direction perpendicular to the surface of the object, wherein a stress-luminescent material is included in at least a portion of the supporting surface and the surface of the contacting portions.

14 Claims, 21 Drawing Sheets

(56) References Cited

U.S. PATENT DOCUMENTS

2009/0286076 A1* 11/2009 Xu ..................... G01M 11/081
           252/301.36
2018/0291945 A1    10/2018 Turner et al.
2020/0191704 A1*   6/2020 Redmond .............. A61B 5/225

FOREIGN PATENT DOCUMENTS

| JP | 2008175587 A | 7/2008 |
| JP | 2014020915 A | 2/2014 |
| JP | 2018163083 A | 10/2018 |
| WO | 2019033159 A1 | 2/2019 |

OTHER PUBLICATIONS

ISA Japanese Patent Office, International Search Report Issued in Application No. PCT/JP2021/037637, Dec. 28, 2021, WIPO, 6 pages.

* cited by examiner (a)

(b)

w=0.8mm w=0.7mm w=0.5mm w=0.3mm w=0.07mm

LIGHT EMITTING STRUCTURE THAT EMITS LIGHT IN ACCORDANCE WITH LOAD, LOAD MEASURING DEVICE EMPLOYING SAME, AND LOAD DISTRIBUTION MEASURING METHOD

CROSS REFERENCE TO RELATED APPLICATIONS

The present application is a U.S. National Phase of International Application No. PCT/JP2021/037637 entitled "LIGHT EMITTING STRUCTURE THAT EMITS LIGHT IN ACCORDANCE WITH LOAD, LOAD MEASURING DEVICE EMPLOYING SAME, AND LOAD DISTRIBUTION MEASURING METHOD," and filed on Oct. 11, 2021. International Application No. PCT/JP2021/037637 claims priority to Japanese Patent Application No. 2020-175040 filed on Oct. 16, 2020. The entire contents of each of the above-listed applications are hereby incorporated by reference for all purposes.

TECHNICAL FIELD

The present invention relates to a load sensor that utilizes light emission to measure a load acting on a reference surface, and a load distribution measuring device, a haptic display, and a load distribution measuring method using the same, and more particularly to those that are able to detect (measure) a small load.

BACKGROUND ART

Techniques for measuring a force (load) acting on a reference surface, and a small load in particular, have heretofore been demanded in various industrial fields. For example, in the automotive industry, tactile sensors for digitizing a tactile impression into a numerical value are being developed at the same time as the development of polymeric materials for providing a high-quality tactile impression or texture. In the robotics industry, pressure sensors and haptic sensors, which are needed to control robot operation, and sensors for detecting behavior of small living beings for the purpose of biomimetics are being developed. In the field of the medical equipment industry, sensors for use in prosthetics and sensors for use in new mechanisms of medical equipment are being developed. Of those described above, in the automotive industry in particular, research and development of polymeric materials having high-quality contact surfaces has been demanded owing to the need for measuring friction and vibration at fingertips.

As a sensor for use in such measurement, for example, a multi-axis force sensor using MEMS (see NPL 1) as a technique for two-dimensionally measuring a small load has been proposed. Moreover, there is a surface pressure distribution measurement system I-SCAN (registered trademark in the United States) (manufactured by NITTA Corporation) using a sheet-like thin film sensor.

There has also been proposed a pressure sensor including an electrode substrate and a conductive rubber member closely opposed in a noncontact state, wherein: both the electrode substrate and the conductive rubber member are circumferentially covered with an insulative cladding member made of a flexible film including at least a fixing agent layer and both are fixed to the insulative cladding member via the fixing agent layer; and the flexible film has a Young's modulus of 2 GPa or more and not more than 10 GPa and a thickness of 10 µm or more and not more than 60 µm (see PTL 1).

CITATION LIST

Patent Literature

PTL 1: Japanese Patent Application Laid-Open No. 2014-020915

Non Patent Literature

NPL 1: Hidetoshi Takahashi, et al., "MEMS two-axis force plate array for measurement of ground reaction force during the running of an ant," Journal of Micromechanics and Microengineering, vol. 24, no. 6, article no. 065014, 2014

SUMMARY OF INVENTION

Technical Problem

However, while the above-described multi-axis force sensor using MEMS can detect a small load with a high sensitivity by employing a cantilever method or piezoelectric element method, there have been problems in configuring a MEMS array, increasing the area of the MEMS, and mass producing the MEMS, and in increasing the manufacturing costs etc.

Sensors using contact resistance of thin metal wires can measure a small load of 50 N to 100 N. However, there is a tradeoff between the load responsiveness and the spatial resolution. Such sensors therefore have had a problem that the spatial resolution and the load responsiveness are difficult to achieve in a compatible manner. Moreover, even the sensors using contact resistance of thin metal wires have had a problem that a load of 1 N or less is unable to be measured.

Multi-axis haptic sensors using MEMS techniques can detect a small load with a high sensitivity but have had a problem of being unable to have the area increased.

Sensors using contact resistance of thin metal wires have had problems of having a low sensitivity to a load and being unable to detect a tactile impression or a small load from pressure waves such as acoustic waves.

Sheet-like pressure sensors that uses a TFT array and are manufactured by using printing techniques have had problems of having a low sensitivity to a perpendicular load and low spatial resolution.

Moreover, many conventional sensors use a method for measuring electrical signals. Wiring from measurement points to electrical signal collection devices (such as an ammeter and an ohmmeter) is indispensable, and there has been a problem that a large sensor area and high spatial resolution are difficult to achieve in a compatible manner.

In view of the above-described circumstances, an object of the present invention is to provide a light emitting structure for emitting light in response to a load applied to an object, and a load sensor, a load distribution measuring device, a light emitting array, a light emitting display, a haptic display, a load measuring method, and a load distribution measuring method that measure (detect) a load using the same.

Solution to Problem

The inventors of the present invention have continued an intensive study of the above-described problems and, as a result, found a revolutionary light emitting structure, and a load sensor, a load measuring device, a load distribution measuring device, a light emitting array, a light emitting display, a haptic display, a load measuring method, and a load distribution measuring method using the same like the following.

A first aspect of the present invention for solving the above-described problems is a light emitting structure configured to emit light in response to a load applied to an object from a load object, wherein: the light emitting structure is disposed on a support surface of the object, contains a mechanoluminescent material, and includes a contact portion that has a predetermined length from the support surface of the object in a direction perpendicular to a surface of the load object; the contact portion has a contact surface to make contact with the surface of the load object; and the contact surface includes a contact region to make contact with the surface of the load object and a noncontact region not to make contact with the surface of the load object.

As employed herein, the "support surface", as shown in FIG. 1, refers to a surface S of an object 100 on a side where a light emitting structure 10 is disposed (side opposed to the load object). The shape and size of the support surface S can be set as appropriate. In the diagram, the light emitting structure 10 includes a plurality of circular columnar contact portions 11. In the diagram, a layer 116 containing the mechanoluminescent material is formed on the surface S. However, the layer 116 may be omitted. The "contact surface" refers to a portion 13 of the load object 200-side surface of the light emitting structure 10 that makes contact with the load object 200. The "contact surface" includes contact regions 15 to make contact with the load object 200 and noncontact regions 16 not to make contact with the load object 200.

The light emitting structure 10 may include one having a structure shown in FIG. 2. Unlike the light emitting structure 10 shown in FIG. 1, a light emitting structure 10A shown in FIG. 2 includes a contact portion 11A of indented shape located at the center. In other respects, the light emitting structure 10A is configured in the same manner as that in the light emitting structure 10 shown in FIG. 1.

According to such a first aspect, the load applied to the contact surface 13 acts on the contact regions 15 included in the contact surface 13. This increases the practical load acting on the contact regions 15. Since a space is formed around the contact portions 11, elastic deformation, elastoplastic deformation, and plastic deformation (deformations in a three-dimensional space, such as compression, bending, and buckling) of the contact portions 11 will not be hindered. High stress caused by the load from the load object 200 thus concentrates on the inside of the contact portions 11.

The mechanoluminescent material contained in the light emitting structure 10 (contact portions 11) has the property of emitting light in response to tensile stress, compressive stress, and shearing stress caused by a load on the mechanoluminescent material. With the mechanoluminescent material fixed to the surface of the object 100 or mixed into the object 100, the light emitting structure 10 emits light with an intensity depending on the acceleration of the elastic deformation and/or plastic deformation (including distortion, bending, and buckling) of the object 100.

As described above, the light emitting structures 10 and 10A according to this aspect include the contact regions 15 and the noncontact regions 16 formed in the contact surface 13 (the contact surface 13 has a discontinuous structure). The light emitting structures 10 and 10A thus have a structural characteristic of dramatically increasing the stress occurring on a mechanoluminescent body compared to a light emitting structure having a contact surface without a noncontact region (light emitting structure that makes contact with the entire surface of the load object 200). As a result, the light emitting structures according to this aspect emit light of high intensity in response to the load applied to the object 100, and the load can be measured (detected) with a high sensitivity by measuring the emission intensity.

A second aspect of the present invention is a light emitting structure configured to emit light in response to a load applied to an object from a load object, wherein: the light emitting structure is disposed on a support surface of the object, contains a mechanoluminescent material, and includes a contact portion that has a predetermined length from the support surface of the object in a direction perpendicular to a surface of the load object; the contact portion has a contact surface to make contact with the surface of the load object; and the support surface includes a support region to make contact with a surface of the object and a nonsupport region not to make contact with the surface of the object.

As employed herein, a "support region", as shown in FIG. 3, refers to a portion 115 that is in contact with a contact portion 11B at the object 100-side surface of a light emitting structure 10B. The light emitting structure 10B includes a plurality of columnar contact portions 11B. A "nonsupport region" refers to a portion 116 that is not in contact with the contact portions 11B at the object 100-side surface of the light emitting structure 10B. The support surface S therefore includes the support regions 115 and the nonsupport regions 116. In this diagram, the layer containing the mechanoluminescent material is formed on the surface S. However, this layer may be omitted.

According to such a second aspect, the load applied to the contact surface 13 from the load object 200 acts on the support regions 115. This practically increases the load acting on the support regions 115. Since a space is formed around the contact portions 11B, elastic deformation, elastoplastic deformation, and plastic deformation (deformations in a three-dimensional space, such as compression, bending, and buckling) of the contact portions 11B will not be hindered. High stress caused by the load from the load object 200 thus concentrates on the inside of the contact portions 11B.

As described above, the support regions 115 and the nonsupport regions 116 are formed at the object 100-side surface of the light emitting structure 10B according to this aspect (a discontinuous structure is formed at the object 100-side surface). The light emitting structure 10B thus has a structural characteristic of dramatically increasing the stress acting on the mechanoluminescent material compared to a light emitting structure having a support region without a nonsupport region (light emitting structure with a support region formed over the entire object 100-side surface). As a result, the light emitting structure according to this aspect emits light of high intensity in response to the load applied to the object 100, and the load can be measured (detected) with a high sensitivity by measuring the emission intensity.

A third aspect of the present invention is the light emitting structure according to the second aspect, wherein the contact surface includes a contact region to make contact with the surface of the load object and a noncontact region not to make contact with the surface of the load object.

Such a third aspect provides the advantageous effects of the first aspect in addition to those of the second aspect. As a result, the light emitting structure according to this aspect emits light of higher intensity in response to the load applied to the object, and the load applied to the object can be measured (detected) with a higher sensitivity by measuring the emission intensity.

A fourth aspect of the present invention is the light emitting structure according to the first or third aspect, wherein a ratio of an area of the contact region to that of the contact surface is less than 1.

According to such a fourth aspect, the area undergoing the load decreases as compared to a light emitting structure without a noncontact region. This increases the pressure on the light emitting structure, and the contact portion may deform greatly (including elastic deformation, elastoplastic deformation, and plastic deformation) depending on an increase in the magnitude of the load. As a result, the light emitting structure according to this aspect emits light of higher intensity in response to the load applied to the object, and the load can be measured (detected) with a higher sensitivity by measuring the emission intensity.

A fifth aspect of the present invention is the light emitting structure according to the second or third aspect, wherein a ratio of an area of the support region to that of the support surface is less than 1.

According to such a fifth aspect, the area of the support region undergoing the load decreases as compared to a light emitting structure without a nonsupport region. This increases the pressure on the light emitting structure, and the contact portion may deform greatly (including elastic deformation, elastoplastic deformation, and plastic deformation) depending on an increase in the magnitude of the load. As a result, the light emitting structure according to this aspect emits light of higher intensity in response to the load applied to the object, and the load can be measured (detected) with a higher sensitivity by measuring the emission intensity.

A sixth aspect of the present invention is the light emitting structure according to any one of the first, third, and fourth aspects, wherein a ratio of the area of the contact region to that of the support region is 1 or less.

According to such a sixth aspect, the load from the load object is received by the contact region with a smaller area. The light emitting structure thus emits light of higher intensity in response to the load applied to the object, and the load applied to the object can be measured (detected) with a higher sensitivity by measuring the emission intensity. Moreover, since the support region is greater, the contact portion can be made to deform not near the support region but near the contact surface when a load is applied thereto. As a result, the light emitting structure becomes less likely to exfoliate from the object near the support region because of repetitive deformation under repetitive load, and the light emitting structure can emit light repeatedly even when a load is applied a plurality of times.

A seventh aspect of the present invention is the light emitting structure according to any one of the second, third, and fifth aspects, wherein a ratio of the area of the support region to that of the contact region is 1 or less.

According to such a seventh aspect, the load from the load object is received by the support region with a smaller area. The light emitting structure thus emits light of higher intensity in response to the load applied to the object, and the load applied to the object can be measured (detected) with a higher sensitivity by measuring the emission intensity. Moreover, since the contact region is greater, the contact portion can be made to deform not near the contact region but near the support region when a load is applied thereto. As a result, the light emitting structure becomes less likely to exfoliate from the object near the contact region because of repetitive deformation under repetitive load, and the light emitting structure can emit light repeatedly even when a load is applied a plurality of times.

An eighth aspect of the present invention is the light emitting structure according to the second or third aspect, wherein a ratio of a volume of the contact portion to a value obtained by multiplying an area of the support region by the predetermined length is 1 or less.

According to such an eighth aspect, the contact portion (for example, an hourglass-like shape where the center part has the smallest horizontal area) has a smaller volume than that of a cube (imaginary contact portion) formed by extending the support region in a perpendicular direction, and thus has a part (local part) where the horizontal cross-sectional area is smaller than that of the imaginary contact portion. The load acting on the light emitting structure thus concentrates on the local part of the contact portion. As a result, the light emitting structure according to this aspect emits light of higher intensity in response to the load applied to the object, and the load can be measured (detected) with a higher sensitivity by measuring the emission intensity.

A ninth aspect of the present invention is the light emitting structure according to any one of the first to third aspects, wherein a ratio of a volume of the contact portion to a value obtained by multiplying an area of the contact region by the predetermined length is 1 or less.

According to such a ninth aspect, the contact portion (for example, an hourglass-like shape where the center part has the smallest horizontal area) has a smaller volume than that of a cube (imaginary contact portion) formed by extending the contact region in a perpendicular direction, and thus has a part (local part) where the horizontal cross-sectional area is smaller than that of the imaginary contact portion. The load acting on the light emitting structure thus concentrates more on the local part of the contact portion. As a result, the light emitting structure according to this aspect emits light of higher intensity in response to the load applied to the object, and the load can be measured (detected) with a higher sensitivity by measuring the emission intensity.

A tenth aspect of the present invention is the light emitting structure according to any one of the first to ninth aspects, wherein a distance between the contact surface of the contact portion when the contact portion is in contact with the load object and the support surface of the object is less than the predetermined length.

According to such a tenth aspect, the contact portion always deforms when being in contact with the load object. The mechanoluminescent material contained in the light emitting structure thus emits light depending on the deformation. As a result, the light emitting structure according to this aspect always emits light of high intensity in response to the load applied to the object, and the load can always be measured (detected) with a high sensitivity by measuring the emission intensity.

An eleventh aspect of the present invention is the light emitting structure according to any one of the first to tenth aspects, wherein a light emitting layer containing the mechanoluminescent material is formed on at least a part of the support surface.

According to such an eleventh aspect, the light emission layer containing the mechanoluminescent material is formed on the support surface of the light emitting structure. If a load is applied to the light emitting structure, the light emitting layer thus emits light depending on a stress distribution on the light emitting structure. Detecting the light emission from the light emitting layer enables light emission depending on the magnitude of the load acting on the light emitting structure and the magnitude of the resulting stress in the contact portion. As a result, since the light emitting layer of the light emitting structure according to this aspect can be formed on the configurations of the first to tenth aspects afterward, the molding and manufacturing processes of the light emitting structure are facilitated. Moreover, the amount of use of the mechanoluminescent body can be reduced. This reduces the manufacturing costs and facilitates control of the physical property values (such as a Young's modulus) of the light emitting structure.

A twelfth aspect of the present invention is the light emitting structure according to any one of the first to eleventh aspects, wherein the contact portion includes a plurality of columnar mechanoluminescent columns.

According to such a twelfth aspect, the load acting on the light emitting structure concentrates on the mechanoluminescent columns that are the contact portion. The mechanoluminescent columns thus deform greatly (including elastic deformation and plastic deformation). Here, the mechanoluminescent columns emit light with an intensity depending on the acceleration of the deformation (including elastic deformation and plastic deformation). As a result, the light emitting structure according to this aspect emits light of higher intensity in response to the load applied to the object, and the load can be measured (detected) with a higher sensitivity by measuring the emission intensity. In particular, according to this aspect, the light emitting structure emits light of high intensity under a distribution of loads of 100 N or less, which has been unable to be measured by conventional sensors, or a distribution of small loads of 60 N or less, or a distribution of even smaller loads of 10 N or less, and the load distribution can be measured with a high sensitivity as an emission intensity distribution.

A thirteenth aspect of the present invention is the light emitting structure according to the twelfth aspect, wherein the mechanoluminescent columns are uniformly arranged on the object at a predetermined distance.

According to such a thirteenth aspect, since the mechanoluminescent columns are uniformly arranged, the load acts on each of the mechanoluminescent columns from the contact surface of the load object. As a result, the light emitting structure according to this aspect exhibits an emission intensity distribution of high intensity depending on the load distribution applied to the object from the load object, and the load distribution can be measured with a high sensitivity on the basis of the emission strength distribution.

A fourteenth aspect of the present invention is the light emitting structure according to the twelfth aspect, wherein the predetermined distance satisfies the following expression.

$$w > \delta \qquad \text{[Exp. 1]}$$

In this expression, w is the predetermined distance, and δ is the amount of deflection of a mechanoluminescent column when the load is applied to the mechanoluminescent columns. The amount of deflection δ can be calculated by a known method.

For example, assume that the contact portion is a columnar structure with a circular cross-sectional shape having a diameter of d, a light emitting layer is formed on the surface of the columnar structure, and the light emitting layer does not affect the buckling load of the columnar structure. In such a case, the amount of deflection δ can be calculated by the following equation.

$$\delta = \frac{Ph^2}{3EI} \qquad \text{[Eq. 2]}$$

In this equation, P is the load acting on the mechanoluminescent column, h is the height of the mechanoluminescent column, and 1 is the second moment of area calculated by the following equation.

$$I = \frac{\pi}{64} d^4 \qquad \text{[Eq. 3]}$$

Here, the light emitting layer to be described below is assumed to not affect the deformation of the contact portion of the light emitting structure. However, similar calculations can be made in terms of material mechanics even in the case where the light emitting layer affects the deformation. While the contact portion of the light emitting structure is assumed to have a circular cross section, its shape is not particularly limited. Similar calculations can be made in terms of material mechanics even if the cross section has a rectangular, hollow rectangular, hollow circular, or any other shape.

A fifteenth aspect of the present invention is the light emitting structure according to the thirteenth aspect, wherein the predetermined distance is in a range of 0.001 mm to 1.00 mm.

According to such a fifteenth aspect, the mechanoluminescent columns spaced at the predetermined distance can easily deform depending on the load from the load object. The light emitting structure according to this aspect thus emits light of high intensity depending on the load applied to the object, and the load distribution can be measured with a higher sensitivity.

A sixteenth aspect of the present invention is the light emitting structure according to any one of the twelfth to fifteenth aspects, wherein the mechanoluminescent columns have a height in a range of 10 nm to 20 mm.

According to such a sixteenth aspect, the mechanoluminescent columns can easily deform depending on the load from the load object. The light emitting structure according to this aspect thus emits light of high intensity depending on the load distribution acting on the object, and the load distribution can be measured with a higher sensitivity.

A seventeenth aspect of the present invention is the light emitting structure according to any one of the twelfth to sixteenth aspects, wherein an area of contact of the mechanoluminescent column with the support region is in a range of 400 $nm^2$ to 400 $mm^2$.

According to such a seventeenth aspect, the area of contact with the support region in the range of 400 $nm^2$ to 400 $mm^2$ prevents exfoliation from the support region even if the load from the load object is applied repeatedly. This enables repetitive use of the light emitting structure.

An eighteenth aspect of the present invention is the light emitting structure according to any one of the twelfth to seventeenth aspects, wherein contact surface-side ends of the mechanoluminescent columns are conical, substantially hemispherical, or substantially spherical in shape.

As employed herein, "substantially hemispherical" is a concept including not only a hemispherical shape but also shapes similar to a hemispherical shape. "Substantially spherical" is a concept including not only a spherical shape but also shapes similar to a spherical shape.

According to such an eighteenth aspect, the load distribution of the load object can be measured with high precision and the direction of the force acting on the object from the load object and the resulting stress distribution can be measured by controlling the shape of the contact surface-side ends of the mechanoluminescent columns. For example, if the contact surface-side ends of the mechanoluminescent columns are shaped into surfaces parallel to the contact surface of the load object, the load from the load object can be evenly distributed among the mechanoluminescent columns, and the light emitting structure emits light depending on the load distribution.

If the contact surface-side ends of the mechanoluminescent columns are shaped to be substantially spherical, the load can be received in the same manner in all directions. The mechanoluminescent components of the components at the ends of the circular columns can thus be observed regardless of the load direction. If the contact surface-side ends of the mechanoluminescent columns are shaped like circular cones with a surface tilted in a specific angular direction, the mechanoluminescent components with respect to the tilted surfaces can be observed. Moreover, if the contact surface-side ends of the mechanoluminescent columns are shaped to be circular cones with a surface tilted in a specific angular direction and the angles are two-dimensionally arranged in a specific pattern, a stress distribution and the like with respect to the specific angle components can be observed.

A nineteenth aspect of the present invention is the light emitting structure according to any one of the first to eleventh aspects, wherein at least a part of the contact portion includes a wall-like mechanoluminescent wall.

As employed herein, "at least a part of the contact portion being a wall-like mechanoluminescent wall" refers to a state where the at least a part of the contact surface of the contact portion to make contact with the load object has a linear shape when seen from the load object side. Examples thereof include states where at least a part of the contact portion is shaped like a line, a ring, a spiral, multiple circles, a grid, and a honeycomb when seen from the load object.

According to such a nineteenth aspect, the load acting on the light emitting structure concentrates on the mechanoluminescent wall, and the mechanoluminescent wall undergoes a predetermined load per unit area. Here, the mechanoluminescent wall emits light with an intensity depending on the acceleration of deformation (including elastic deformation and plastic deformation). As a result, the light emitting structure according to this aspect emits light of higher intensity in response to the load applied to the object, and the load can be measured (detected) with a higher sensitivity by measuring the emission intensity.

A twentieth aspect of the present invention is the light emitting structure according to any one of the first to eleventh aspects, wherein the contact portion has a substantially semicircular or substantially semi-elliptical section at a load object side.

As employed herein, "substantially semicircular" is a concept including not only a semicircular shape but also shapes similar to a semicircular shape. "Substantially semi-elliptical" is a concept including not only semi-elliptical shapes but also shapes similar to semi-elliptical shapes.

According to such a twentieth aspect, as shown in FIG. 4, at the moment when the load object 200 comes into contact with the light emitting structure 10, the load object 200 makes point contact with the load object-side ends of substantially semicircular or substantially semi-elliptical shape. The contact surface 13 at that moment thus includes the contact points (contact regions) at the load object-side ends of substantially semicircular or substantially semi-elliptical shape. In other words, at the moment when the load object 200 comes into contact, the contact surface 13 (the load object-side ends of substantially semicircular or substantially semi-elliptical shape) undergoes a high load. As a result, the light emitting structure 10 according to this aspect emits light of higher intensity in response to the load applied to the object 100, and the load can be measured (detected) with a higher sensitivity by measuring the emission intensity.

Since the object-side ends of substantially semicircular or substantially semi-elliptical shape are directly formed on the support regions, the support regions of the contact portions are greater than the contact regions. As a result, exfoliation of the contact portions from the support regions can be prevented even if a load is repeatedly applied to the light emitting structure. This enables repetitive use of the light emitting structure.

Note that the support regions of the light emitting structure of substantially semicircular or substantially semi-elliptical shape are not limited to the surface on the object. For example, similar advantageous effects are obtained even if the support regions are formed on a smooth two-dimensional flat surface of a resin, ceramics, metal, or a composite material (the support surface is formed on the two-dimensional flat surface), the light emitting structure of substantially semicircular or substantially semi-elliptical shape is placed in contact with the object, and the two-dimensional flat surface is located to make contact with the load object.

A twenty-first aspect of the present invention is the light emitting structure according to any one of the first to eleventh aspects, wherein at least a part of the contact portion on a load object side includes a plurality of mechanoluminescent cones of substantially conical shape.

As employed herein, "substantially conical" is a concept including not only cones but also shapes similar to cones.

According to such a twenty-first aspect, the light emitting structure makes point contact with the load object. The light emitting structure thus emits light of higher intensity in response to the load applied to the object, and the load can be measured (detected) with a higher sensitivity by measuring the emission intensity. Since the support regions are greater than the contact regions, exfoliation from the support regions is less likely even if the load from the load object is repeatedly applied. This enables repetitive use of the light emitting structure according to this aspect.

A twenty-second aspect of the present invention is the light emitting structure according to any one of claims 1 to 11, wherein the contact region of the contact surface is substantially mesh-like in shape.

As employed herein, "substantially mesh-like" is a concept including not only mesh-like shapes but also shapes similar to mesh-like shapes.

According to such a twenty-second aspect, the load from the load object acts on the contact region of porous mesh structure. A high stress therefore occurs on the contact portion. As a result, the light emitting structure according to this aspect emits light of higher intensity in response to the load applied to the object, and the load can be measured (detected) with a higher sensitivity by measuring the emission intensity.

A twenty-third aspect of the present invention is the light emitting structure according to any one of the first to twenty-second aspects, wherein the predetermined length is a plurality of different discrete lengths from the surface of the object in a direction perpendicular to the surface of the object.

According to such a twenty-third aspect, when the load from the load object is applied, the longest contact portion emits light first. Then, as the load increases, the light emitting structure is compressed and contracted, and the next longest contact portion makes contact with the load object and emits light. Such operations are repeated from contact portions having greater predetermined heights to ones having smaller predetermined heights in succession. Since a plurality of mechanoluminescent columns of different discrete lengths are thus used, the contact portions can be made to emit light stepwise depending on the magnitude of the load.

A twenty-fourth aspect of the present invention is the light emitting structure, wherein the discrete lengths decrease from a center of the contact surface to a periphery of the contact surface.

According to such a twenty-fourth aspect, light emission in response to the load from the load object can be increased by arranging contact portions of the same height within a two-dimensional plane to support an initial load in a linear or planar manner. Supporting the initial load in a linear or planar manner can reduce the load acting on each of the contact portions, whereby the durability of the contact portions can be improved.

A twenty-fifth aspect of the present invention is the light emitting structure according to the twenty-second aspect, wherein the contact portion includes a plurality of columnar mechanoluminescent columns, mechanoluminescent columns having the longest discrete length are arranged in two rows intersecting at a center of the contact surface, and mechanoluminescent columns other than the mechanoluminescent columns are arranged so that the discrete lengths decrease from the center of the contact surface to a periphery of the contact surface.

According to such a twenty-fifth aspect, since the contact portions of the same heights are arranged within the two-dimensional plane, the initial load is supported in a linear or planar manner. This can increase the light emission in response to the load from the load object. Moreover, supporting the initial load in a linear or planar manner can reduce the load acting on each of the contact portions and improve the durability of the contact portions.

A twenty-sixth aspect of the present invention is the light emitting structure according to any one of the first to twenty-fifth aspects, wherein: a light emitting layer containing the mechanoluminescent material is disposed on its surface; a material layer is disposed on the light emitting layer; the material layer has a Young's modulus higher than that of the light emitting layer; and the material layer has a thickness 1 or less/3 of that of the light emitting layer. The light emitting layer and the material layer may be disposed over the entire surface of the light emitting structure, and are preferably disposed on the surface excluding the support surface-side surface. The material layer may be disposed on a surface portion where the light emitting layer is not disposed.

According to such a twenty-sixth aspect, the Young's modulus of the light emitting structure can be freely controlled by depositing a material layer having a higher Young's modulus than that of the light emitting layer on the light emitting layer. A light emitting structure having an optimum Young's modulus or rigidity for the magnitude of the load to be applied from the load object can thus be provided. As a result, the light emitting structure according to this aspect emits light of higher intensity in response to the load applied to the object, and the load can be measured (detected) with a higher sensitivity by measuring the emission intensity.

A twenty-seventh aspect of the present invention is the light emitting structure according to any one of the first to twenty-sixth aspects, wherein a protective member is disposed on a part or all of a load object-side surface of the contact portion.

According to such a twenty-seventh aspect, the provision of the protective member on a part or all of the load object-side surface of the contact portion can prevent excessive concentration of the load on a part of the contact portion, whereby the light emitting structure becomes harder to break. As a result, the durability of the light emitting structure improves. If the load is applied from the load object to a noncontact portion, the load on the noncontact portion acts on the contact portion via the protective member since the protective member is disposed on the contact portion. As a result, the light emitting structure according to this aspect emits light of higher intensity in response to the load applied to the object, and the load can be measured (detected) with a higher sensitivity by measuring the emission intensity.

A twenty-eighth aspect of the present invention is the light emitting structure according to any one of the first to twenty-seventh aspects, wherein a space around the contact portion is filled with a filler having a lower rigidity than that of the contact portion.

According to such a twenty-eighth aspect, since the space around the contact portion is filled with the filler having the lower rigidity than that of the contact portion, the contact portion can be prevented from being broken or irrecoverably bent when the load is applied to the light emitting structure.

A twenty-ninth aspect of the present invention is the light emitting structure according to any one of the first to twenty-sixth, wherein at least either an object-side part of a space around the contact portion or a load object-side part of the space around the contact portion is filled with a filler having a higher rigidity than that of the contact portion.

According to such a twenty-ninth aspect, since at least either the object-side part of the space around the contact portion or the load object-side part of the space around the contact portion is filled with the filler having the higher rigidity than that of the contact portion, the filler restricts bending and buckling of at least either the upper end or the lower end of the contact portion in contact with the filler when the load is applied to the light emitting structure. Greater bending or buckling therefore occurs in a part of the contact portion other than that part. As a result, the load distribution on the object can be measured (detected) with a high sensitivity.

A thirtieth aspect of the present invention is a load sensor for measuring a magnitude of a load applied to an object from a load object on the basis of emission intensity, the load sensor including the light emitting structure according to any one of the first to twenty-ninth aspects.

According to such a thirtieth aspect, a load sensor that emits light of higher intensity in response to the load applied to the object and can measure (detect) the load with a higher sensitivity by measuring the emission intensity can be provided.

A thirty-first aspect of the present invention is a load distribution measuring device for measuring a distribution of a magnitude of a load applied to an object from a load object on the basis of a distribution of emission intensity, the load distribution measuring device including the load sensor according to the thirtieth aspect and a detection unit that detects light emission of the load sensor.

According to such a thirty-first aspect, a load measuring device that can measure the load applied to the object with a high sensitivity can be provided. In particular, a load measuring device that can detect a small load of 100 N or less, which has been unable to be measured by conventional load measuring devices using light emission as a measurement signal, with a high sensitivity can be provided.

A thirty-second aspect of the present invention is the load measuring device according to the thirty-first aspect, wherein a load direction of the load object is detected on the basis of order of light emission of contact portions. According to such a thirty-second aspect, a load measuring device that can detect the load direction of the load object on the basis of the order of light emission of the contact portions can be provided.

A thirty-third aspect of the present invention is a light emitting display configured to detect contact of a load object on the basis of light emission without a power supply, the light emitting display including a display unit configured to make contact with the load object, the light emitting structure according to any one of the first to twenty-ninth aspects being disposed on the display unit.

According to such a thirty-third aspect, a light emitting display that can detect the contact of the load object with the display unit on the basis of light emission without needing a power supply can be provided.

A thirty-fourth aspect of the present invention is a haptic display configured to detect contact of a human body part on the basis of light emission without a power supply, the haptic display including a display unit configured to make contact with the human body part, the light emitting structure according to any one of the first to twenty-ninth aspects being disposed on the display unit.

According to such a thirty-fourth aspect, a haptic display that detects the contact of the human body part on the basis of light emission without a power supply can be provided.

A thirty-fifth aspect of the present invention is a load measuring method for measuring a load applied to an object from a load object on the basis of an emission intensity, the load measuring method including the steps of: attaching the load sensor according to the twenty-eighth aspect to a surface of the object; and applying the load to the object from the load object via the load sensor.

According to such a thirty-fifth aspect, the load and the load distribution on the object can be measured with a high sensitivity. In particular, a small load of 100 N or less and a distribution of such loads, which have been unable to be measured by conventional load measuring methods and load distribution measuring methods, can be measured with a high sensitivity.

A thirty-sixth aspect of the present invention is the light emitting structure according to claim 1, wherein: a columnar portion includes a columnar member and a layer containing the mechanoluminescent material at least on a part of a surface of the columnar member; and the columnar member has a flexural modulus of 3 GPa or less.

According to such a thirty-sixth aspect, the application of even a load of 1 N or less can cause light emission. In other words, a load of 1 N or less can be measured (detected) by using the light emitting structure according to this aspect. The flexural modulus of the columnar member is preferably higher than 0 Pa and 3 GPa or less, and more preferably 0.1 GPa or more and not more than 2.5 GPa. If the flexural modulus of the columnar member is 0.1 GPa or more and not more than 1 GPa, the load of an even smaller load (for example, 0.5 N or less) can be measured (detected).

BRIEF DESCRIPTION OF DRAWINGS

FIG. 4(a) shows a state before a load object makes contact with the light emitting structure. FIG. 4(b) shows a state at the moment when the load object makes contact with the light emitting structure.

FIG. 20 is a schematic view of a light emitting structure according to a seventh embodiment.

FIG. 21 is a schematic view of a light emitting structure according to an eight embodiment.

DESCRIPTION OF EMBODIMENTS

Embodiments of a light emitting structure according to the present invention, and a load distribution measuring device, a light emitting display, a haptic display, and a load distribution measuring method using the same will be described below with reference to the accompanying drawings. Note that the present invention is not limited to the following embodiments.

First Embodiment

A load distribution measuring device according to the present embodiment includes a load sensor including a light emitting structure configured to measure a load applied to an object from a load object on the basis of light emission, and a detection unit that detects the light emission of the load sensor. As employed herein, the load object is not particularly limited and may be any solid, liquid, or gas that can apply a load to the object.

The detection unit is not particularly limited and may be any detection unit that can detect the light emission of the load sensor. The detection unit may be a commercially available camera, video camera, or the like. The attachment position of the detection unit is not particularly limited and may be any position where the light emission of the light emitting structure can be detected. The load sensor and the detection unit may be connected to constitute a load measuring device that measures the load applied to the object from the load object. A load control apparatus configured to control the load to be applied to the load object, the load sensor, and the detection unit may be connected to constitute a measuring device that measures the degree of application of the load to the object from the load object. The light emitting structure used for such sensors and devices will now be described in detail.

Figure 1:
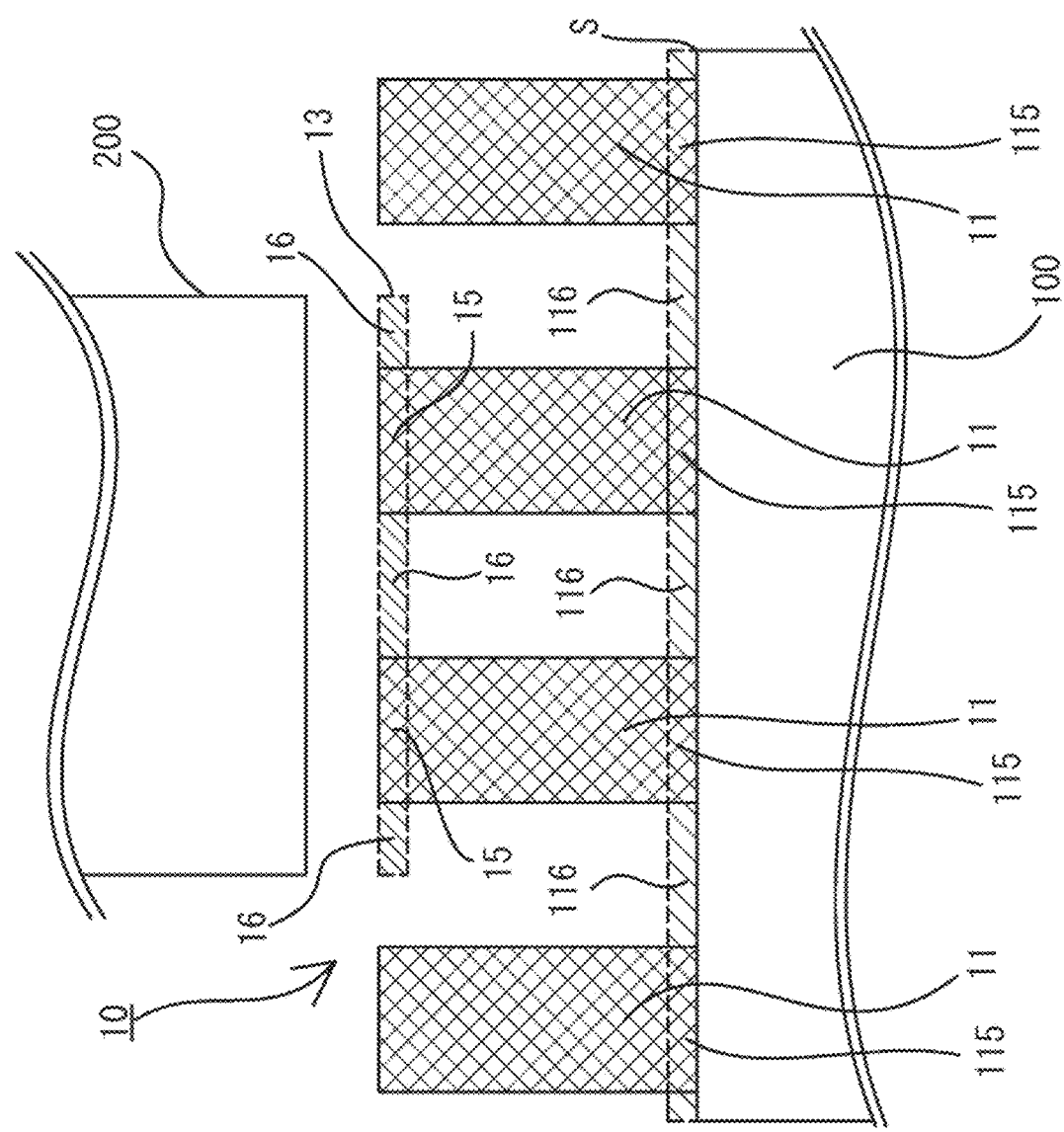
FIG. 1 is a schematic side view of a light emitting structure for describing terminology according to the present invention.
Figure 2:
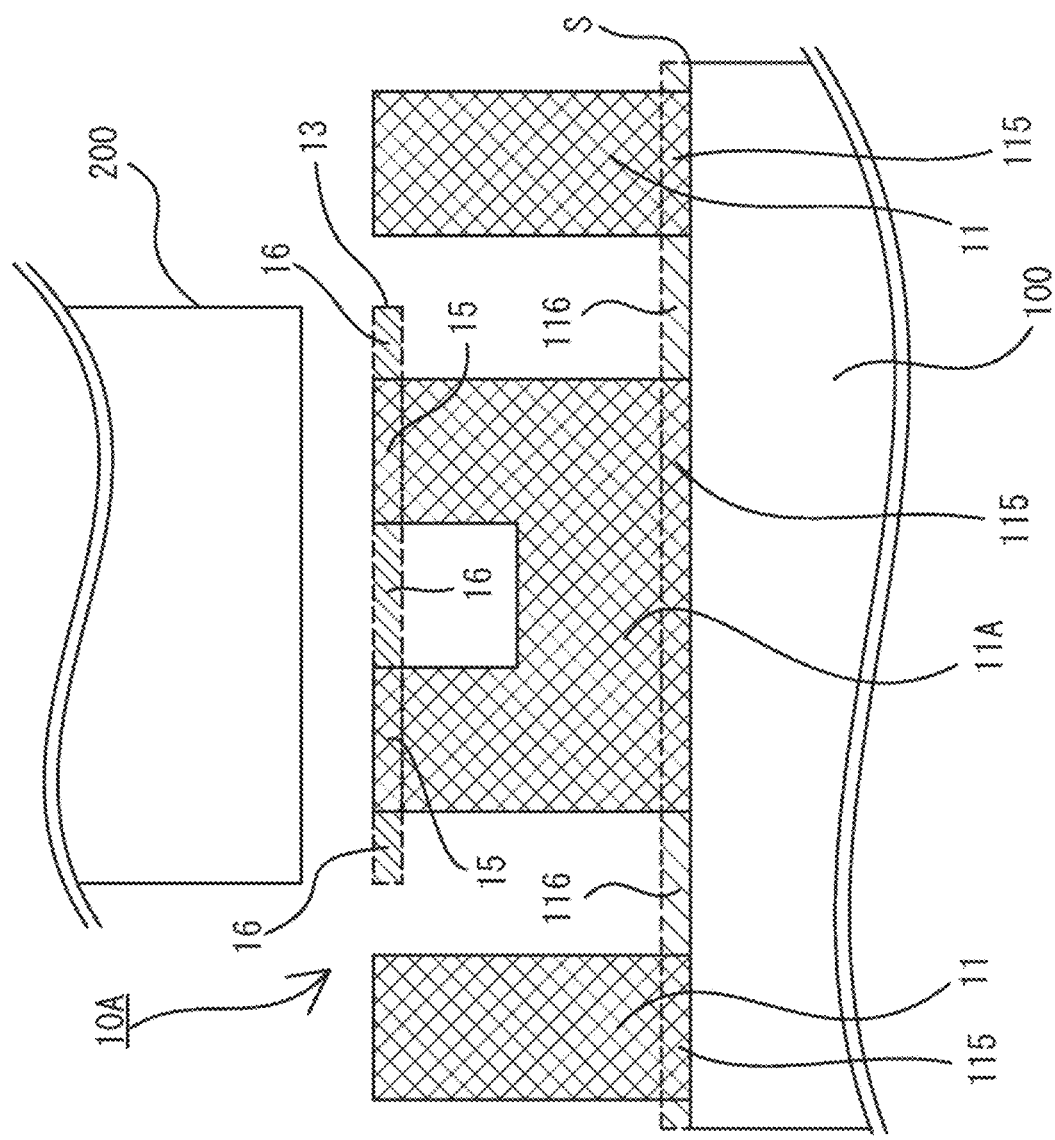
FIG. 2 is a schematic side view of a light emitting structure for describing the terminology according to the present invention.
Figure 3:
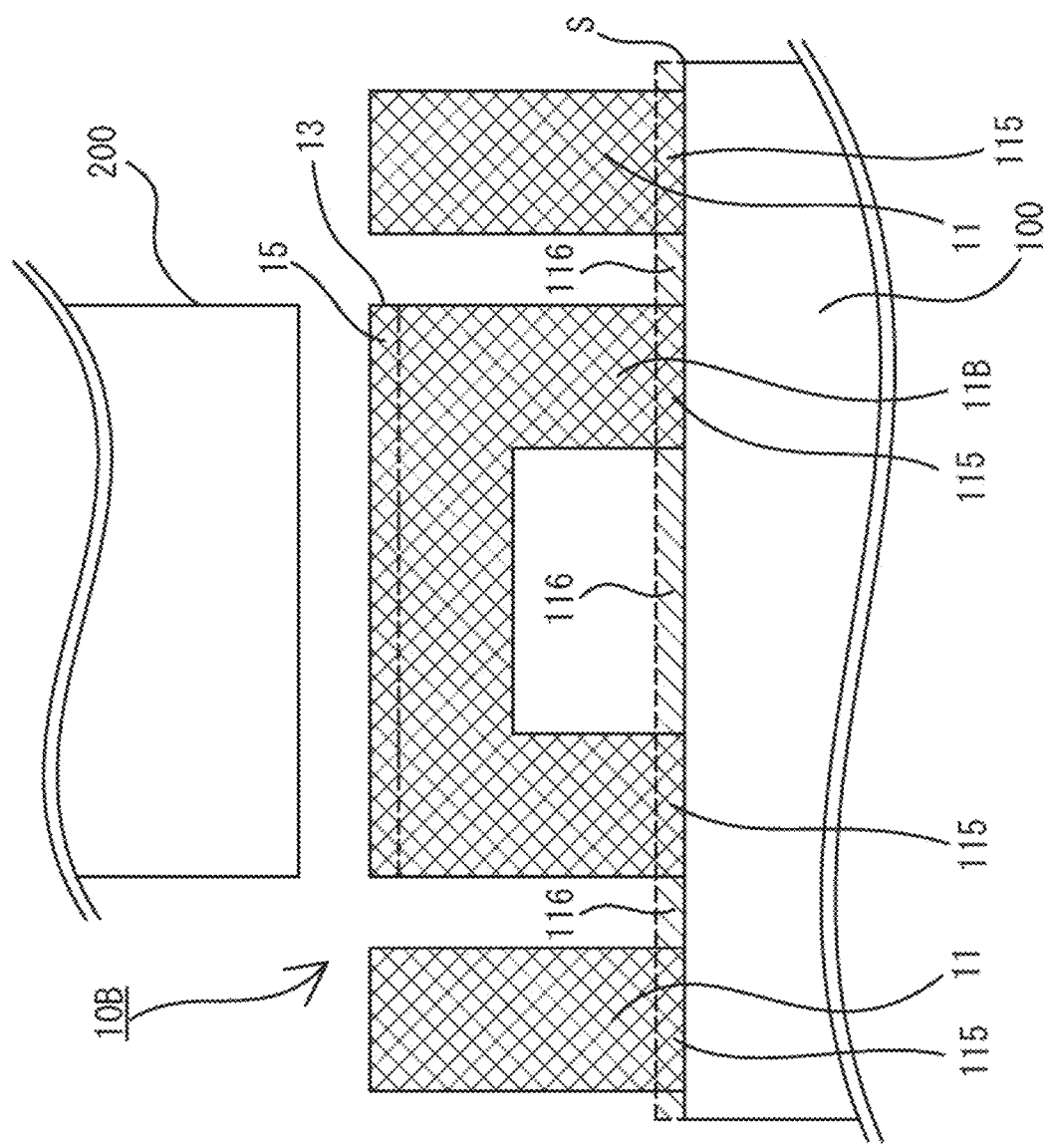
FIG. 3 is a schematic side view of a light emitting structure for describing the terminology according to the present invention.
Figure 4:
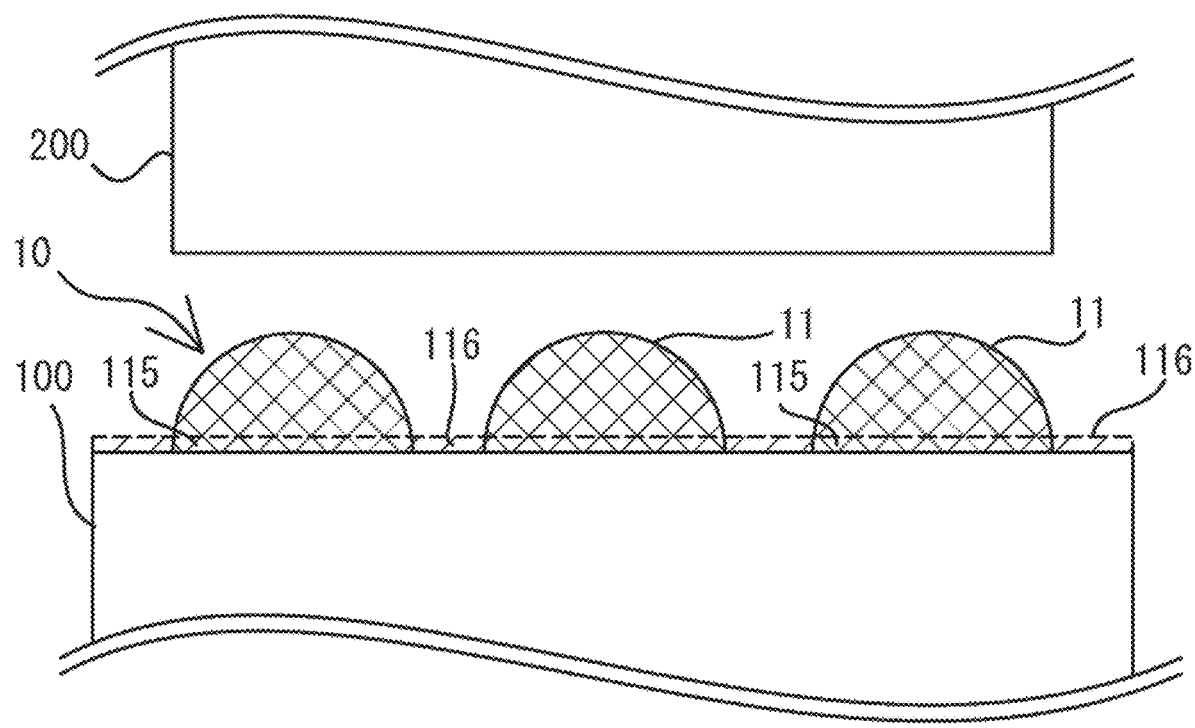
FIG. 4 is a schematic cross-sectional view of a light emitting structure for describing the terminology according to the present invention.
Figure 4:
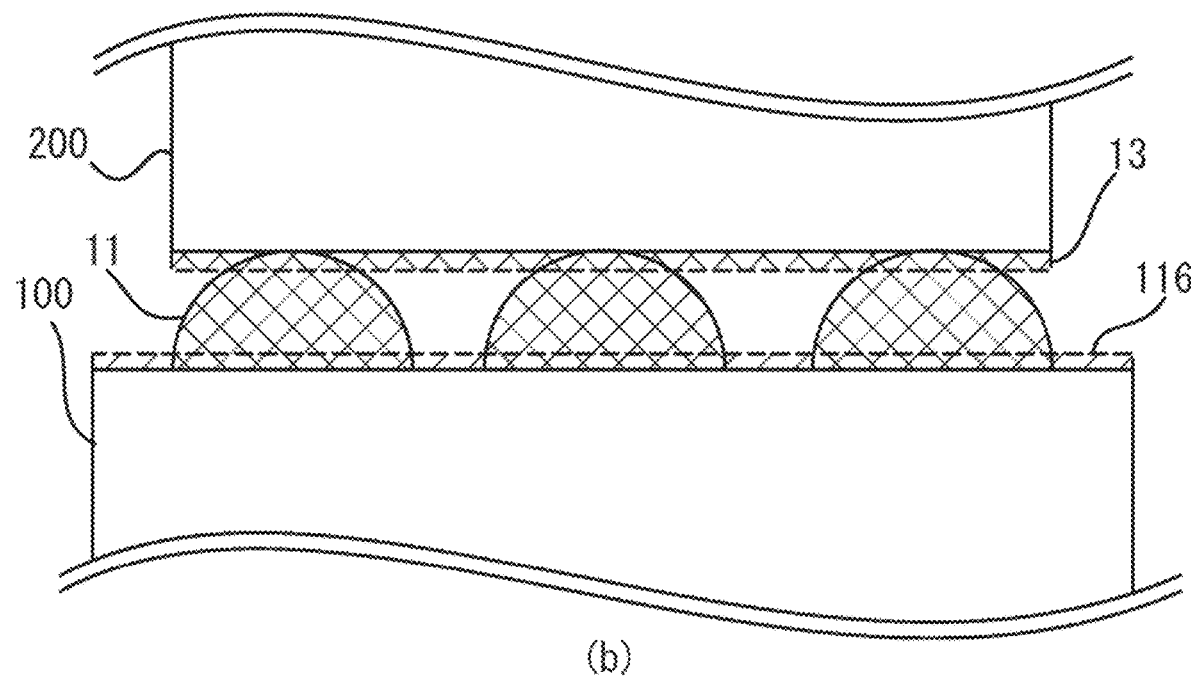
Figure 5:
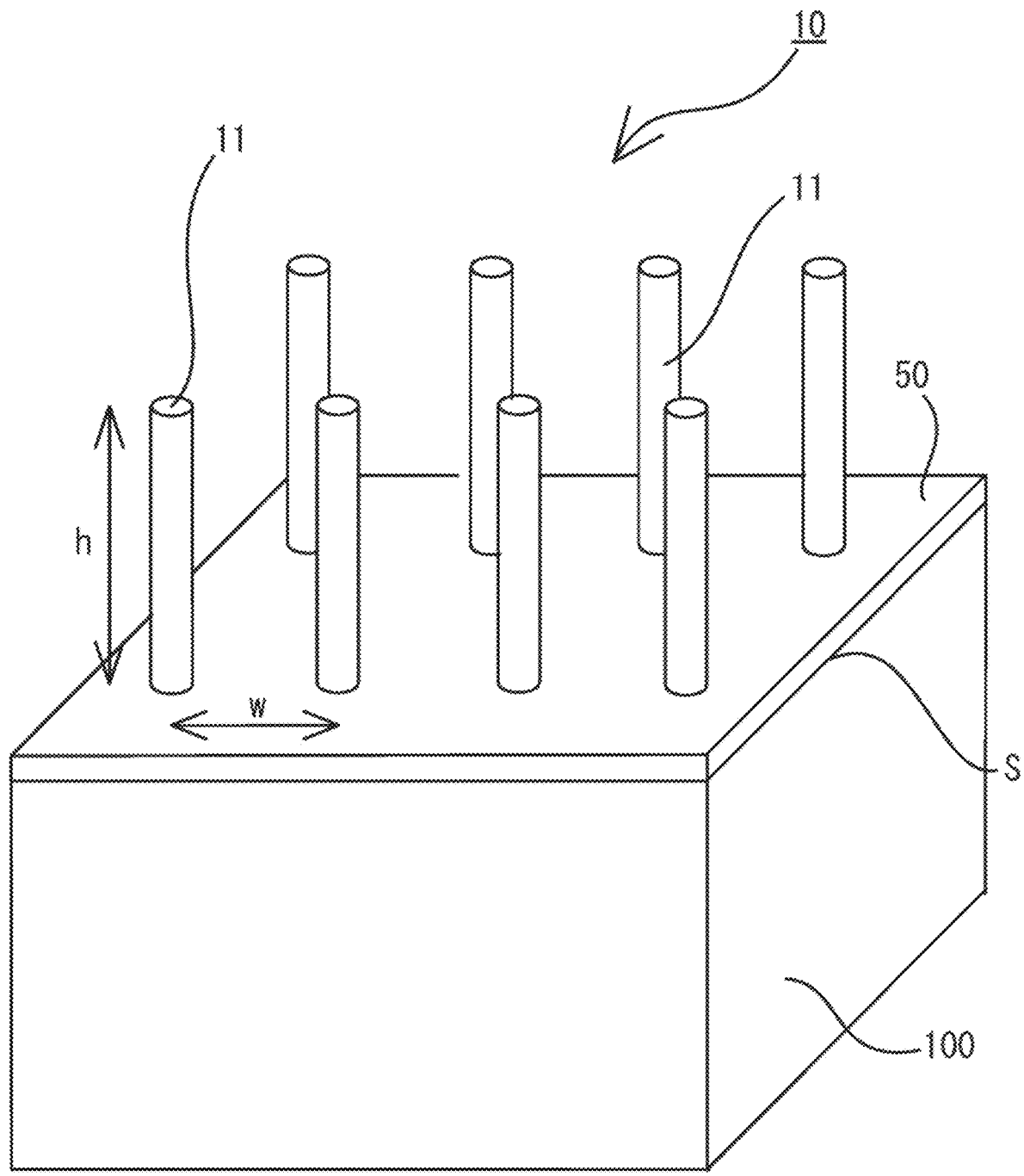
FIG. 5 is an enlarged schematic perspective view of a part of a light emitting structure according to a first embodiment.

FIG. 5 is an enlarged schematic perspective view of a part of the light emitting structure according to the present embodiment. As shown in the diagram, a light emitting structure 10 that is also a load sensor includes a mechanoluminescent layer 50 disposed on a support surface S of a plate-like object 100 having a smooth surface, and a plurality of mechanoluminescent columns (columnar portions) 11 that are contact portions (columnar parts) disposed on the support surface S of the object 100. In the present embodiment, as shown in FIG. 1 described above, regions of the object 100-side surface of the light emitting structure 10 in contact with the support surface S are referred to as support regions 115. Regions not in contact with the support surface S are referred to as nonsupport regions 116. Meanwhile, the light emitting structure 10 makes contact with a load object 200 at a contact surface 13, where the top surfaces of the mechanoluminescent columns 11 are referred to as contact regions 15 and the other regions as noncontact region 16.

In this configuration, the ratio of the area of the contact regions 15 to the area of the contact surface 13 is smaller than 1, and at the same time, the ratio of the area of the support regions 115 to the area of the support surface S is smaller than 1.

Each of the mechanoluminescent columns 11 is arranged so as to have a predetermined distance (interval) w from the adjacent mechanoluminescent columns (columnar parts) 11, and is formed uniformly on the object 100 in the present embodiment (so that the distances between the adjacent mechanoluminescent columns are all w).

Here, the height h of the mechanoluminescent column 11 is not particularly limited, but it is desirable that the height h fall within the range of 10 nm to 20 mm because the mechanoluminescent columns can emit light of high intensity in response to a load applied to the light emitting structure 10. It is more preferable that the height h thereof fall within the range of 0.001 mm to 10 mm because the mechanoluminescent columns can emit light of higher intensity in response to a load applied to the light emitting structure 10. It is still more preferable that the height h thereof fall within the range of 0.01 mm to 1.00 mm because the mechanoluminescent columns can emit light of still higher intensity in response to a load applied to the light emitting structure 10. It is preferable that the heights h of the respective mechanoluminescent columns 11 be the same or substantially the same as one another because the load distribution applied to the light emitting structure 10 can be accurately measured.

Furthermore, the distance (interval) w between each of the mechanoluminescent columns 11 and the mechanoluminescent columns 11 adjacent thereto is not particularly limited, but it is desirable that the distance (interval) w fall within the range of 20 nm to 1.00 mm because the mechanoluminescent columns can emit light of high intensity with a light emission distribution depending on the load distribution applied to the light emitting structure 10. It is preferable that the distance (interval) w fall within the range of 0.002 mm to 0.90 mm because the mechanoluminescent columns can emit light of higher intensity with a light emission distribution depending on the load distribution applied to the light emitting structure 10. It is more preferable that the distance (interval) w fall within the range of 0.07 mm to 0.90 mm because the mechanoluminescent columns can emit light of still higher intensity with a light emission distribution depending on the load distribution applied to the light emitting structure 10.

Furthermore, the shape of the mechanoluminescent column 11 is not particularly limited as long as it extends in a direction substantially perpendicular (substantially vertical direction) to the support surface of the object 100. For example, the cross-sectional shape in the horizontal direction (a cross-sectional shape when the mechanoluminescent column 11 is cut in the horizontal direction) is not particularly limited, and may be a circle, an ellipse, a triangle, a square, a hexagon, a hollow shape, or an irregular shape. The cross-sectional shape of the mechanoluminescent column 11 in an axial direction (a cross-sectional shape when the mechanoluminescent column 11 is cut in the perpendicular direction) is also not particularly limited, and may be any shape such as a triangle, a square, a rectangle, a trapezoid, a hollow shape, or an irregular shape. The "direction substantially perpendicular" refers to a direction in a range of −20 degrees to 20 degrees with respect to a direction perpendicular (90 degrees) to the support surface of the object 100, and preferably refers to a direction in a range of −10 degrees to 10 degrees. The shape of the mechanoluminescent column 11 is particularly preferably a conical shape because the mechanoluminescent column 11 with such a shape can emit light even under a smaller load.

The mechanoluminescent column 11 is not particularly limited as long as a light emitting layer that contains a mechanoluminescent material to emit light in response to deformation (including elastic deformation and plastic deformation) by contact with a load object is formed on at least the surface thereof. The light emitting layer may be formed on all surfaces of the mechanoluminescent columns other than the surfaces in contact with the support region, or may be formed only on a part thereof.

Here, the mechanoluminescent columns 11 deform with compressive contraction under a load in a direction perpendicular to the mechanoluminescent columns 11, and bending deformation under a load from a horizontal direction component. For compressive contraction, assume that the light emitting layer does not affect the compressive contraction of the light emitting structure. The amount of compressive contraction ΔL when a load P is applied to a contact portion (mechanoluminescent column 11) of the light emitting structure 10 having a Young's modulus E and a contact cross-sectional area A satisfies the following relationship in the elastic deformation range.

$$\frac{P}{A} = E \times \frac{\Delta L}{L} \quad \text{[Eq. 4]}$$

The amount of compressive contraction ΔL can thus be calculated from this relational equation.

By contrast, for bending deformation, assume that a contact portion (mechanoluminescent column 11) is a columnar structure with a circular cross-sectional shape having a diameter of d, the light emitting layer is formed on the surface of the columnar structure, and the light emitting layer does not affect the buckling load of the columnar structure.

The amount of deflection δ when a load (component in the in-plane direction of the light emitting structure) P is applied to the end of the contact portion of the columnar structure having a Young's modulus E and a second moment of area 1 is given by the following equation.

$$\delta = \frac{Ph^2}{3EI} \quad \text{[Eq. 5]}$$

The amount of defection δ of the bending deformation can thus be easily calculated by a known calculation method using the property constant of the material and the constant calculated from the material shape. Here, the light emitting layer is assumed to not affect the deformation of the contact portions (mechanoluminescent columns 11) of the light emitting structure. However, similar calculations can be made in terms of material mechanics even if the light emitting layer affects the deformation.

Moreover, if the parts of the mechanoluminescent columns 11 to make contact with the load object (ends of the contact portions) are controlled in shape, a load distribution in a characteristic direction can be observed. For example, if the ends of the mechanoluminescent columns 11 are shaped like circular columns, the direction of the load acting on the top ends of the circular columns can be observed. If the ends are shaped like circular cones with a surface tilted in a specific angular direction, the direction of the load acting on the surfaces tilted in the angular direction can be observed. If the mechanoluminescent columns of conical shape with a surface tilted in a specific angular direction are arranged at regular distances on a two-dimensional plane, the angle (direction) of a force with respect to the tilted specific angular components can be detected.

The mechanoluminescent column 11 may be constituted only by a mechanoluminescent material, but may be one produced by uniformly mixing and curing, for example, an epoxy resin or a urethane resin, a curing agent for controlling the crosslinking and curing reaction of these resins and a solvent, and the mechanoluminescent material and a dispersant and an auxiliary agent for uniformly dispersing the mechanoluminescent material.

Furthermore, the mechanoluminescent column 11 may adopt a product in which a central portion of the mechanoluminescent column 11 is constituted by a material (a resin, silicon, or the like) different from the mechanoluminescent material, and the surface thereof is covered with a mechanoluminescent material or a material obtained by mixing the above-described mechanoluminescent material and an epoxy resin or the like. The mechanoluminescent column 11 having such a structure can be manufactured by applying or spraying the mechanoluminescent material or a material obtained by mixing the above-described mechanoluminescent material and an epoxy resin or the like onto a material constituting the central portion, followed by curing. Furthermore, the central portion of the mechanoluminescent column 11 can be fabricated using semiconductor process or the like.

Here, the mechanoluminescent material is not particularly limited as long as the material emits light (including visible light, ultraviolet light, and near-infrared light) in response to deformation caused by a mechanical external force. As the mechanoluminescent material, may be mentioned those composed of, as the base material, for example, oxides, sulfides, oxysulfides, phosphates, silicates, carbides, nitrides or oxynitrides, with a stuffed tridymite structure, a three-dimensional network structure, a feldspar structure, a crystal structure with controlled lattice defects, a wurtz structure, a spinel structure, a corundum structure or a β-alumina structure and a perovskite structure, and, as an emission center, for example, rare earth ions of Sc, Y, La, Ce, Pr, Nd, Pm, Sm, Eu, Gd, Tb, Dy, Ho, Er, Tm, Yb and Lu, and transition metal ions of Ti, Zr, V, Cr, Mn, Fe, Co, Ni, Cu, Zn, Nb, Mo, Ta and W.

If, for example, a composite oxide containing strontium and aluminum is used as the base material among these materials, those materials using $xSrO \cdot yAl_2O_3 \cdot zMO$ or $xSrO \cdot yAl_2O_3 \cdot zSiO_2$ as the mechanoluminescent material (M is not particularly limited as long as it is a divalent metal, with Mg, Ca, or Ba being preferred, and x, y, and z represent an integer of 1 or more) are preferred. $SrMgAl_{10}O_{17}$:Eu, $(Sr_xBa_{1-x})Al_2O_4$:Eu(0<x<1), and $BaAl_2SiO_8$:Eu are more preferred. In the present embodiment, it is most preferable that the mechanoluminescent material have an $\alpha$-$SrAl_2O_4$ structure and contain Eu as an emission center.

Furthermore, as the mechanoluminescent material, in order to increase the luminescence sensitivity against strain, a material to which a substance that causes lattice defects in the production of the mechanoluminescent material is added is preferred, and in particular, a material to which Ho is added is preferred. By adding a substance that causes such a lattice defect, it is possible to improve the luminescence sensitivity to a large strain energy. The average particle diameter (measured by a laser diffraction method) of the mechanoluminescent material is preferably 20 μm or less, and more preferably 10 μm or less.

The concentration of the mechanoluminescent material contained in the stress luminescent column 11 (weight ratio) is not particularly limited, and it is desirable that the concentration thereof fall within the range of 20 wt % to 100 wt % because the mechanoluminescent columns can emit light of enough emission intensity (brightness). It is more preferable that the concentration thereof fall within the range of 50 wt % to 100 wt % because the mechanoluminescent columns can emit of higher emission intensity.

The mechanoluminescent layer 50 is not particularly limited as long as the layer contains a mechanoluminescent material. The mechanoluminescent layer 50 may be, for example, integrally composed of the same material as that of the mechanoluminescent columns 11, or may be composed of those containing different mechanoluminescent materials. The thickness of the mechanoluminescent layer 50 is not particularly limited, and it is possible to detect the load applied to the object with a high sensitivity without affecting the magnitude of the load applied to the mechanoluminescent column 11 as long as the thickness falls within the range of 0.003 mm to 1.00 mm.

The object 100 is not particularly limited as long as the light emitting structure 10 can be disposed on the support surface S. Examples of the object 100 include a film made of a polycarbonate (PC) or a film made of a cycloolefin polymer (COP) resin, a low-density polyethylene (LDPE), an elastomer, a high-density polyethylene (HDPE), a polypropylene (PP), a polymethyl methacrylate resin (PMMA), a polyester (PE), an ABS resin, a polyacetal (POM), a polyether ether ketone (PEEK), and a polymer alloy (PC/PE or PC/PMMA). The thickness of the object 100 is also not particularly limited.

Figure 6A:
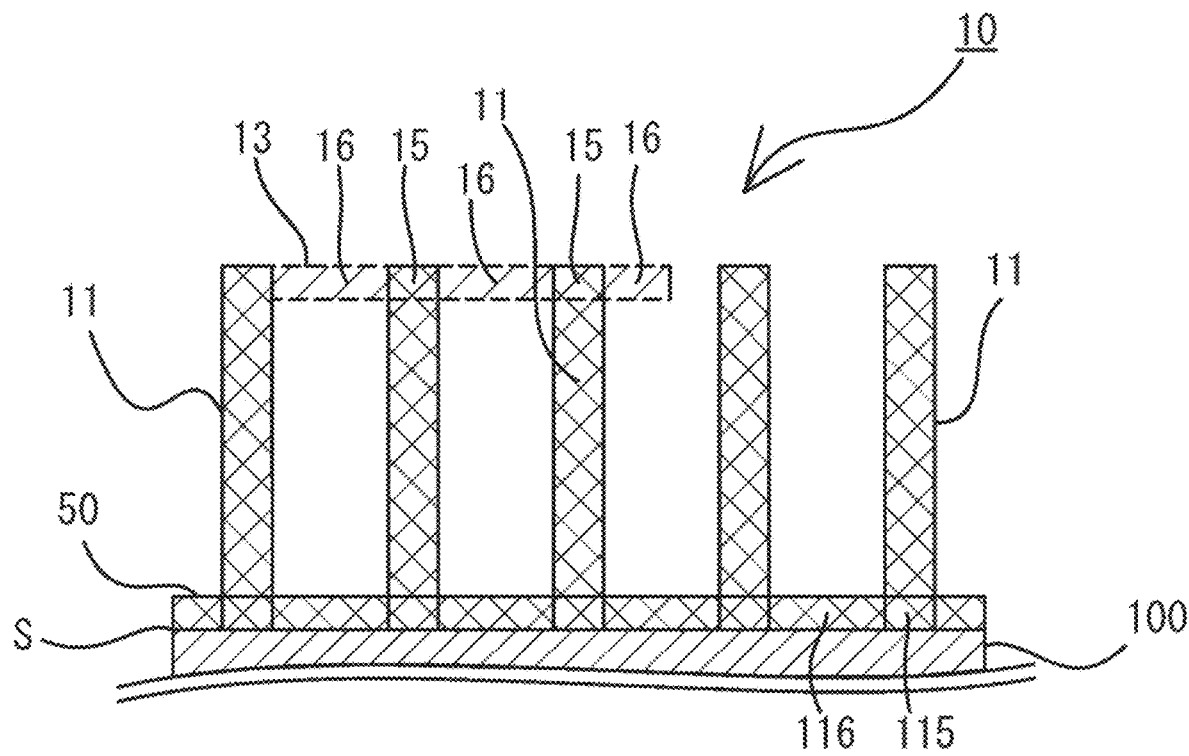
FIG. 6(a) is a schematic cross-sectional view of the light emitting structure before a load is applied.
Figure 6B:
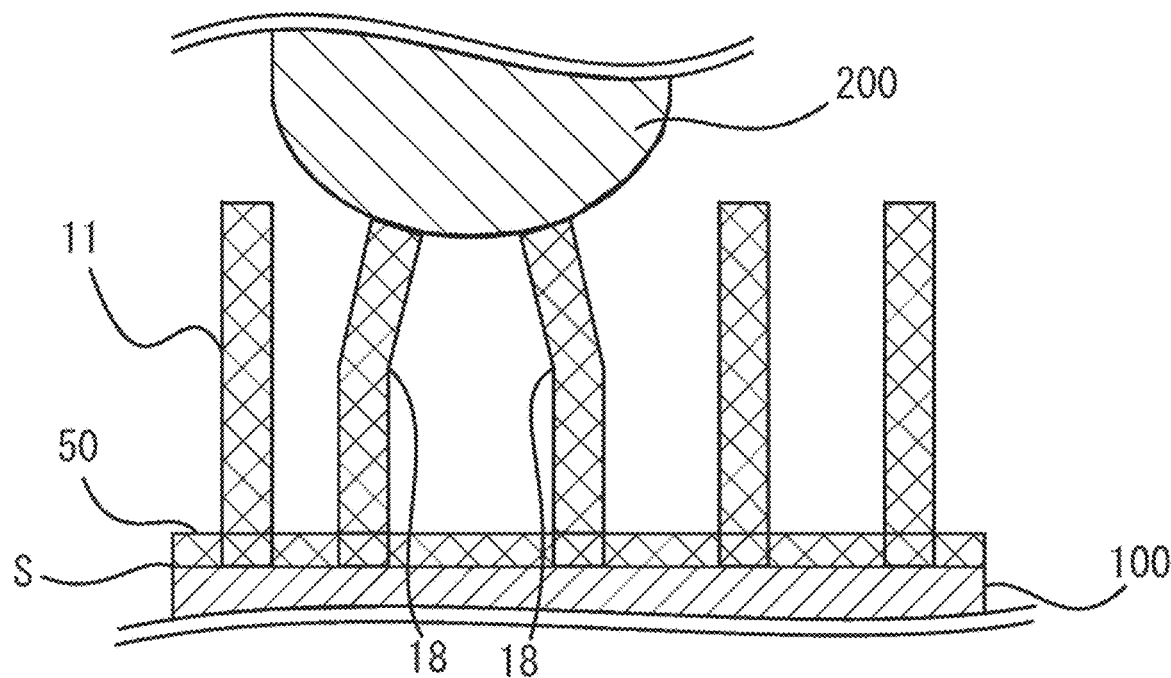
FIG. 6(b) is a schematic cross-sectional view of a part of the light emitting structure when a load is applied.

As shown in FIG. 6, if no load (load) is applied to this light emitting structure 10 (see FIG. 6(a)), the mechanoluminescent columns 11 stand close together in a substantially perpendicular direction (substantially vertical direction) each. If the load of the load object 200 is applied, the mechanoluminescent columns 11 undergoing the load make compressive deformation and/or bending deformation, and then at least some of the mechanoluminescent columns 11 are deformed (buckled or bent at bending portions 18) (see FIG. 6(b)). In other words, the distance between the contact surface 13 and the support surface S of the object 100 becomes smaller than a predetermined length h of the mechanoluminescent columns 11 that are the contact portions. Here, the mechanoluminescent material contained in those mechanoluminescent columns 11 emits light with emission intensity depending on the acceleration of the compressive deformation, bending deformation, and bending. As a result, the load distribution applied to the object can be detected with a high sensitivity by measuring the emission intensity of each mechanoluminescent column 11.

As shown in FIG. 6(b), the mechanoluminescent columns 11 bend toward where the load is highest. The location (direction) undergoing the highest load can thus be found out by detecting the bending directions and light emitting positions of the bending portions 18 of the mechanoluminescent columns 11 (relative directions of the light-emitting portions in the mechanoluminescent columns 11).

Note that the light emitting structure 10 is flexible, and can thus be pasted to a flat surface or the surface of a complex three-dimensional structure with an adhesive and the like. As a result, the load distribution applied to the pasted object can be measured.

Next, a manufacturing method capable of manufacturing a light emitting structure 10 having a large area inexpensively will be described. It will be understood that the light emitting structure 10 can also be manufactured by using conventional techniques such as electron beam lithography and screen printing.

Method for Manufacturing Resin Substrate Using Microfabricated Mold

A plastic mold steel material (for example, STAVAX (registered trademark), brass, or the like) having a plurality of column-like pits and protrusions corresponding to the shape of the mechanoluminescent columns 11 on the surface is initially fabricated by using a method described in Japanese Patent Application Laid-Open No. 2012-40878. Using the steel material and its thermal imprint system or the like, the pits and protrusions on the surface of the steel material are then transferred to the surface of a resin substrate made of a polycarbonate or cycloolefin polymer (COP) resin or the like to fabricate a resin substrate having a microstructured surface.

Method for Manufacturing Mechanoluminescent Layer on Resin Substrate Having Microstructured Surface First, a mechanoluminescent coating material is prepared by uniformly mixing an epoxy resin or a urethane resin, a curing agent and a solvent for controlling the crosslinking and curing reaction of these resins, and a mechanoluminescent material and a dispersant and an auxiliary agent for uniformly dispersing the mechanoluminescent material.

Next, the surface of the produced resin substrate on which the microstructure has been formed is cleaned with pure water or the like, and then the mechanoluminescent coating material is applied to the surface of the resin substrate on which the microstructure has been formed. After that, the resin substrate is dried at room temperature, and then heated again at a predetermined temperature to dry the mechanoluminescent coating material. The resin substrate is then cut into an arbitrary size and shape, thereby fabricating the light emitting structure 10 that also serves as a load sensor.

Example 1

Figure 7:
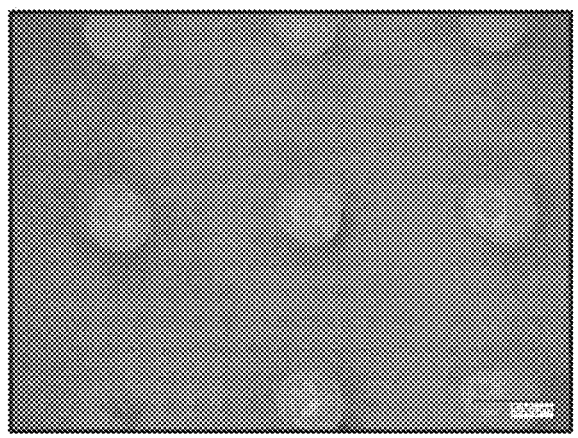
FIG. 7 shows photographs of the top surfaces of light emitting structures according to example 1.
Figure 7:
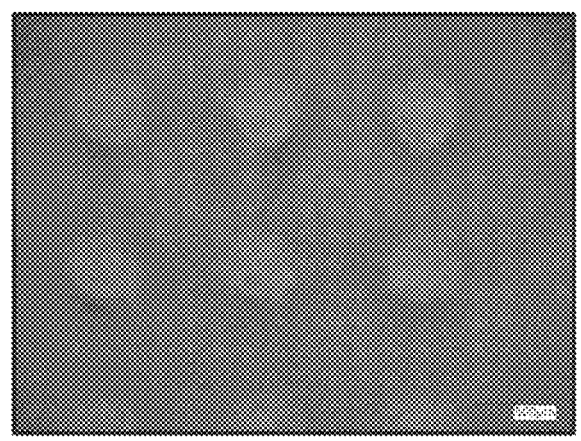
Figure 7:
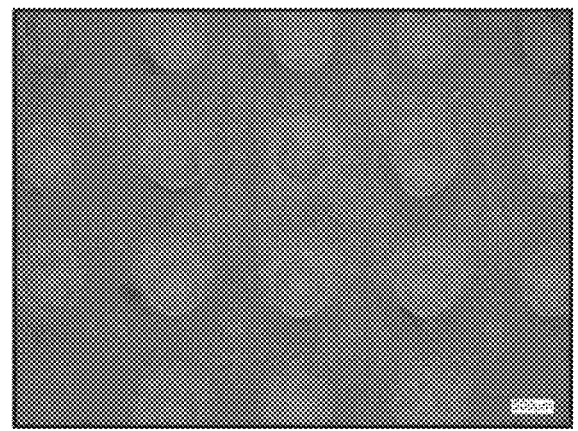
Figure 7:
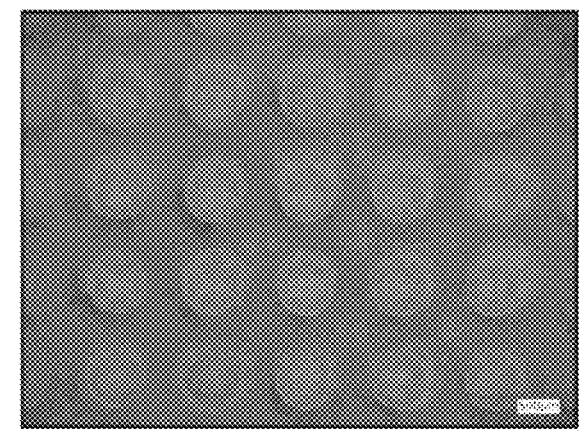
Figure 7:
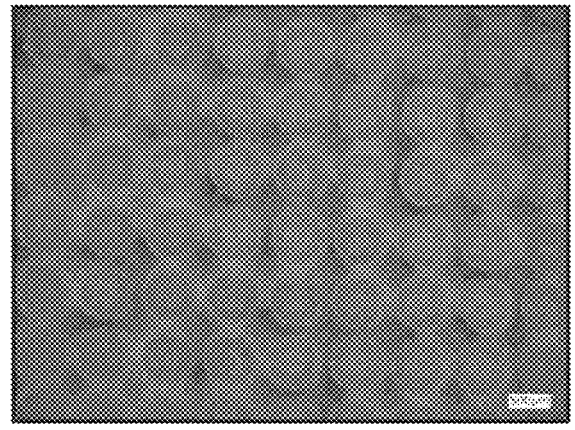

Using the above-described manufacturing methods, load sensors (20-mm square) were formed on a 50-μm-thick polycarbonate (PC) or cycloolefin polymer (COP) resin film (with a plurality of circular columnar protrusions (columnar portions) having a diameter of 0.3 mm and a specific height (0.2 to 0.6 mm) on its surface; such circular columnar protrusions shaped the cores of the mechanoluminescent columns). As shown in FIG. 7, the load sensors each included a light emitting structure including a plurality of mechanoluminescent columns as well as an 80-μm-thick mechanoluminescent layer 50 on the surface of the above-described resin film.

The mechanoluminescent columns (with a horizontal cross-sectional diameter of 0.4 mm and a specific height (0.2 to 0.6 mm)) had a circular columnar shape. The distance w between the adjacent mechanoluminescent columns varied from one load sensor to another.

$SrAl_2O_4:Eu^{2+}$ (manufactured by SAKAI CHEMICAL INDUSTRY CO., LTD.) was used as the mechanoluminescent material on the surfaces of the mechanoluminescent columns and in the mechanoluminescent layer. An epoxy resin (manufactured by Dai Nippon Toryo Company, Limited) was used as the resin.

Figure 8:
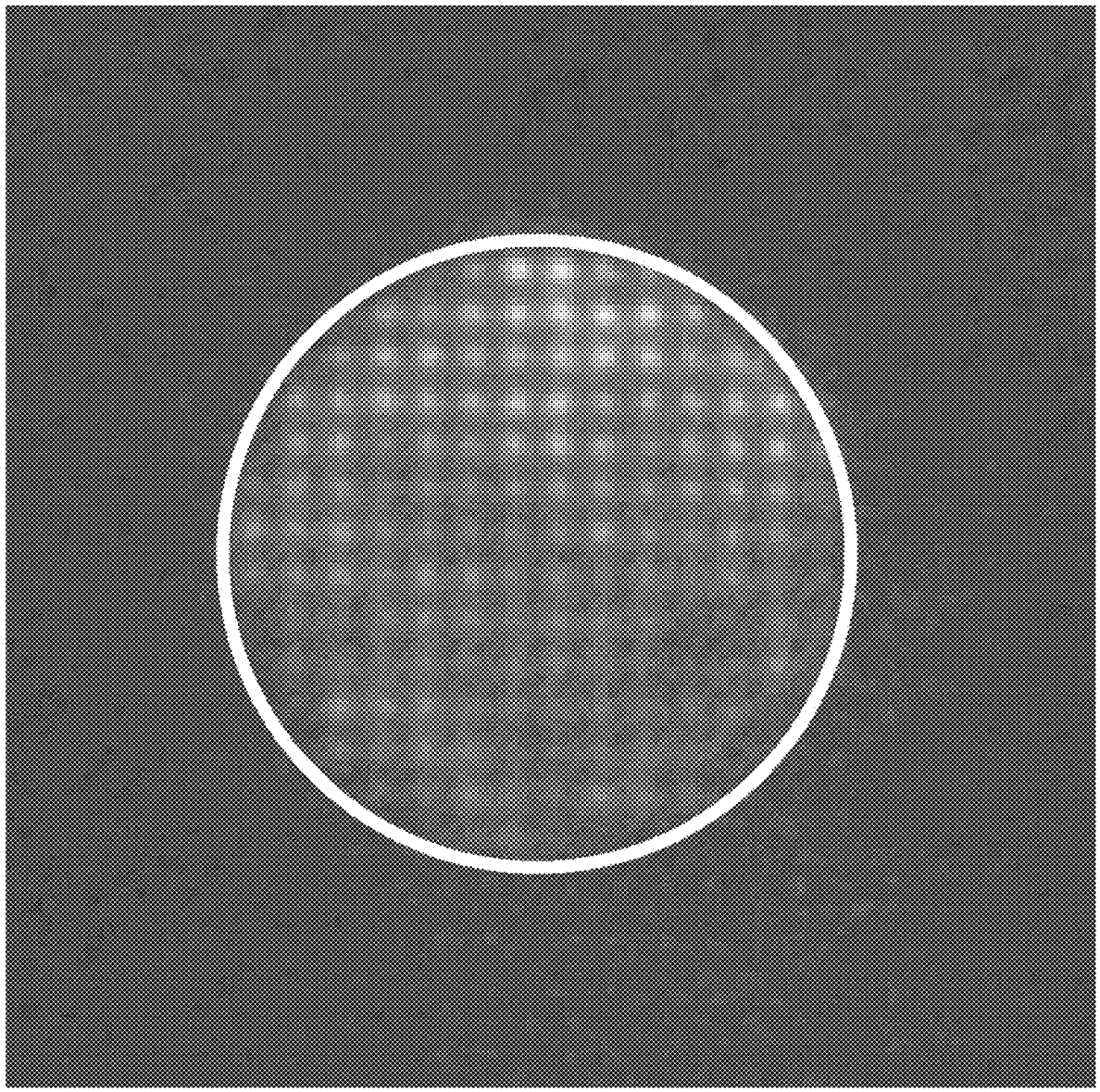
FIG. 8 is a photograph showing a state of light emission when a load is applied to a light emitting structure where a distance between adjacent mechanoluminescent columns is 0.8 mm.

Next, FIG. 8 shows a state of light emission of one of the load sensors where the distance w between adjacent mechanoluminescent columns was 0.4 mm, to which a load was applied with the load object in contact with load sensor. The circle shown by the white line in the diagram represents the outer shape of the contact surface of the load object. Here, a stainless-steel platen having a diameter of 10 mm was used as the load object. Specifically, each load sensor was placed on a 15-mm-thick transparent acrylic substrate, and the state of light emission of the load sensor was measured under a controlled load and stroke using a material compression tester (EZ-SX manufactured by Shimadzu Corporation) to which the stainless-steel platen was attached.

As can be seen from the diagram, this load sensor emits light only from mechanoluminescent columns located near the portion in contact with the load object.

Figure 9:
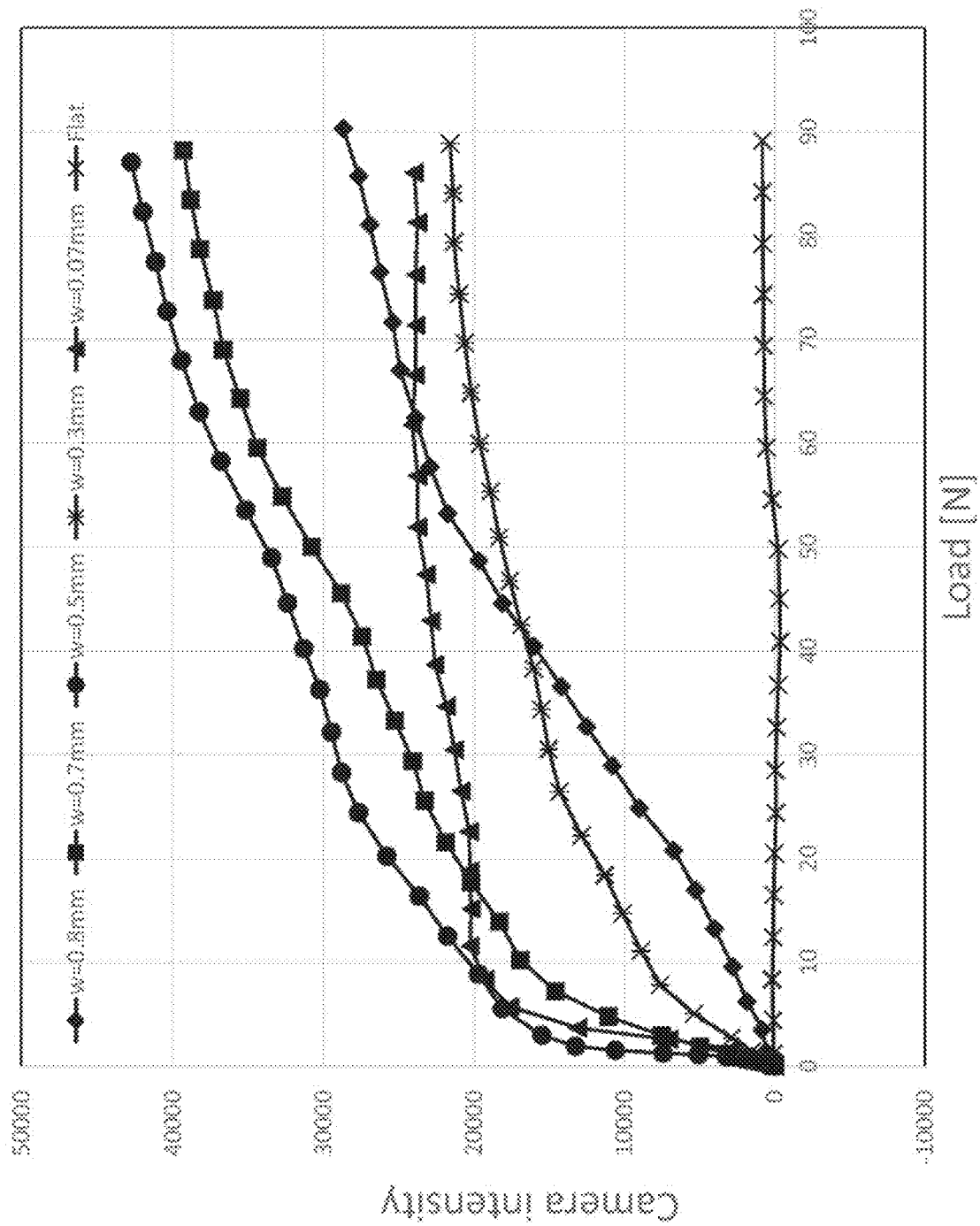
FIG. 9 is a graph showing a relationship between the magnitude of a load applied to the light emitting structures according to respective examples and emission intensity recorded by a camera that is a detection unit.

FIG. 9 shows a graph showing a relationship between the magnitude of the load applied to each load sensor and the emission intensity recorded by a camera that is the detection unit.

Here, the curve marked with x (flat) represents a comparative example. The comparative example was an 80-μm-thick flat mechanoluminescent layer formed on a 50-μm-thick polycarbonate film without mechanoluminescent columns.

As can be seen from the graph, examples 1 to 5 emitted sufficient light even at 100 N or less as compared to the comparative example. It can also be seen that unlike the comparative example, examples 1 to 5 increased in emission intensity as the load increased.

Example 2

Figure 10:
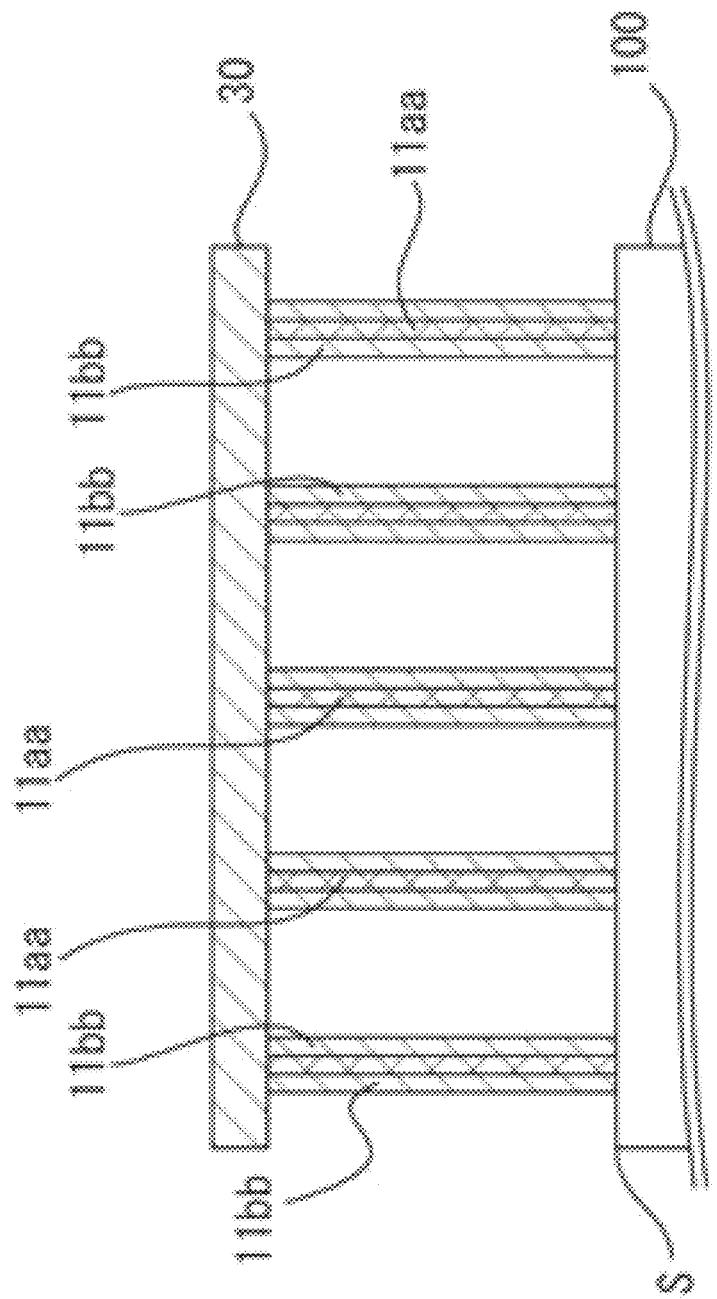
FIG. 10 is a schematic cross-sectional view of a light emitting structure according to example 2.

Using the above-described manufacturing methods, a plurality of circular columnar protrusions (columnar portions) having a diameter of 0.4 mm and a height of 0.6 mm were fabricated on the surfaces of a 50-μm-thick acrylic resin (PMMA) and cycloolefin polymer (COP) resin. The circular columnar protrusions were uniformly formed so that adjacent circular columnar protrusions and the distance were 0.3 mm. Here, the flexural modulus of the acrylic resin was 3.4 GPa, and the flexural modulus of the cycloolefin polymer was 2.4 GPa (both were measured using a material tester (EZ-SX 100N) from Shimadzu Corporation). As shown in FIG. 10, an 80-μm-thick mechanoluminescent layer 11*bb* composed of the mechanoluminescent material and an epoxy resin was formed on the surfaces of such columnar protrusions 11*aa*. Two types of load sensors (20-mm square) including the light emitting structures fabricated using the different resins (PMMA and COP) were fabricated.

Figure 11:
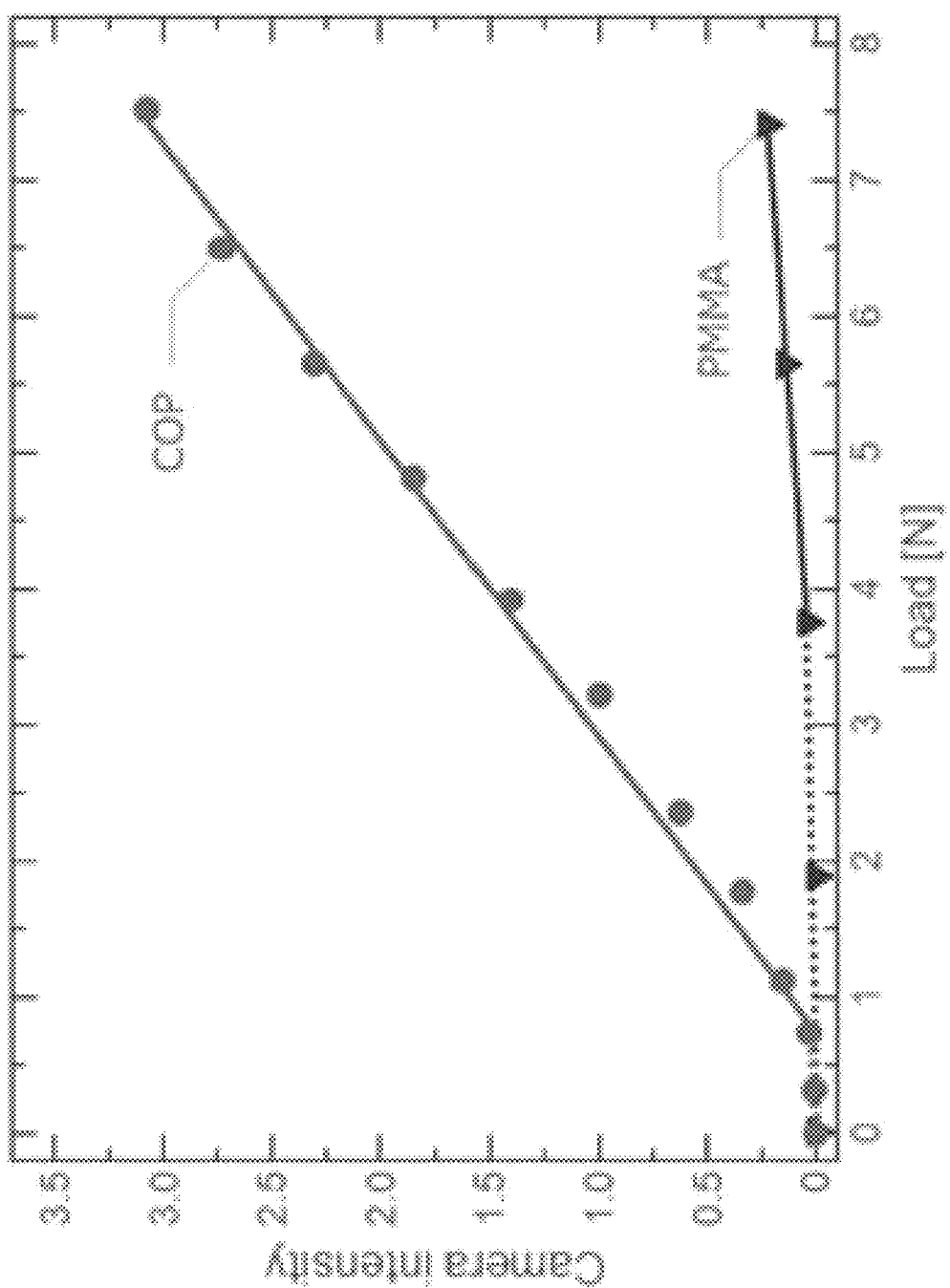
FIG. 11 is a graph showing a relationship between the load and the emission intensity according to example 2.

Each load sensor was set in the material tester, and the emission intensity (camera intensity) of the load sensor and the load when the load object was put into contact were measured. FIG. 11 shows the measurements. As can be seen from the graph, the light emitting structure using PMMA emits light under a load of approximately 4 N or more while the load sensor using COP emits light even under a load of 1 N or less.

Second Embodiment

In the first embodiment, the light emitting structure is configured such that the mechanoluminescent column and the object that applies a load on the mechanoluminescent column are in direct contact with each other. However, the present invention is not limited thereto.

Figure 12:
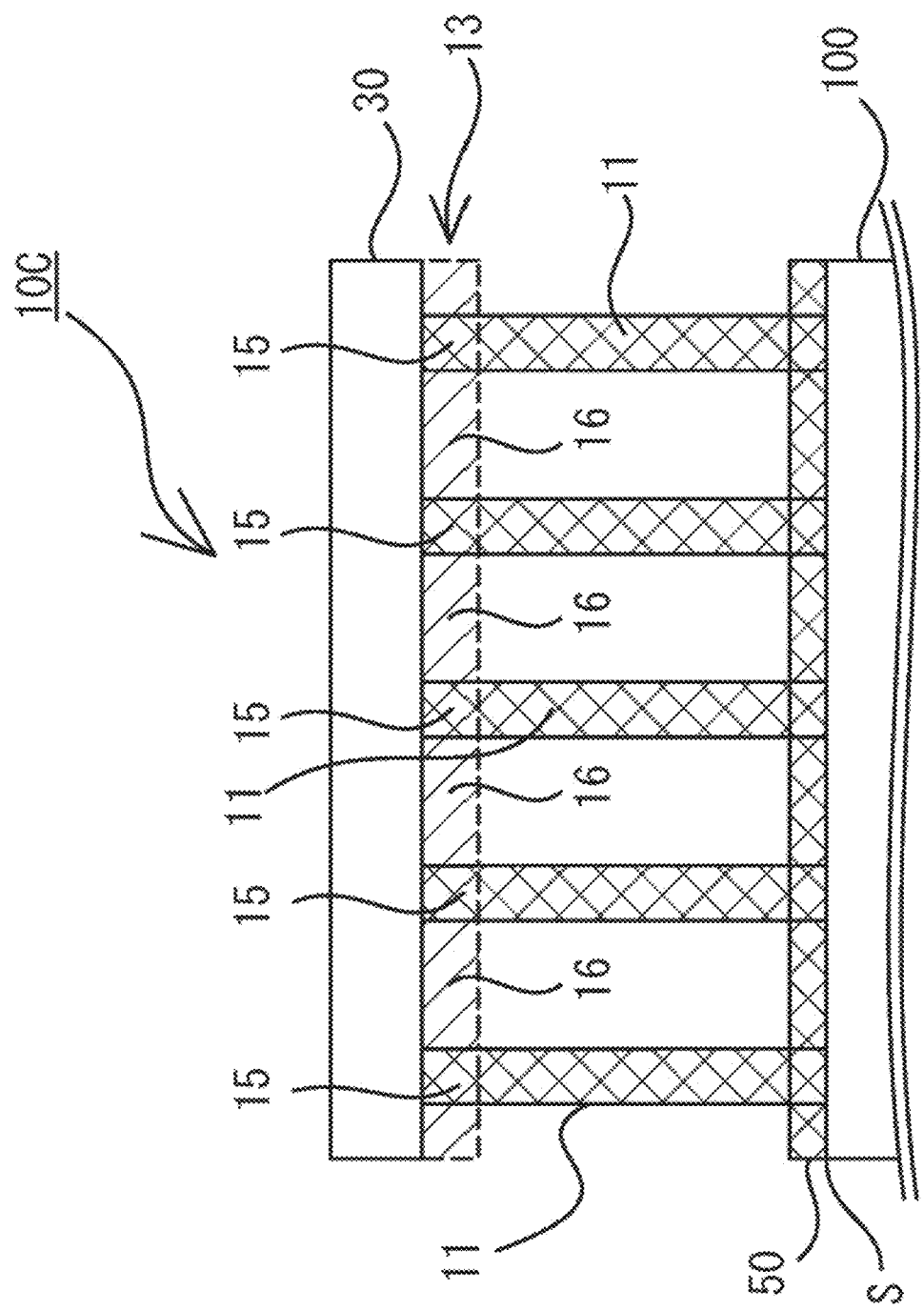
FIG. 12 is a schematic cross-sectional view of a light emitting structure according to a second embodiment.

For example, as shown in FIG. 12, a protective member 30 may be provided so as to cover the load object 200-side surfaces of the respective mechanoluminescent columns 11 serving as a contact portion, thereby constituting the light emitting structure 10C. FIG. 12 is a schematic cross-sectional view of a part of the light emitting structure according to the present embodiment.

Here, the protective member 30 is not particularly limited as long as it can cover at least a part of the top surface of the light emitting structure 10. The protective member 30 is not particularly limited as long as it has flexibility, and for example, a polycarbonate film can be used. The thickness of the protective member 30 is not particularly limited as long as it can be bent by the load applied from the load object 200.

Since the light emitting structure 10C is thus configured, the concentration of the load applied from the load object 200 on certain mechanoluminescent columns 11 can be prevented in addition to advantageous effects similar to those of the light emitting structure according to the first embodiment. This makes the mechanoluminescent columns 11 less likely to break. If the load applied from the load object 200 acts only on a noncontact region 16, the load on the noncontact region 16 is applied to the contact regions 15 via the protective member 30 since the protective member 30 is disposed on the load object 200-side surfaces of the mechanoluminescent columns 11 that are the contact portions. The total load applied from the load object 200 can thus be conducted to the light emitting structure 10C.

Such a light emitting structure 10C can be fabricated by simply placing the protective member 30 on top of the load object 200-side surfaces of the mechanoluminescent columns 11. The light emitting structure 10C can also be fabricated by attaching the protective member 30 onto the load object 200-side surfaces of the mechanoluminescent columns 11 using an adhesive or the like.

Third Embodiment

In the second embodiment, the light emitting structure is configured so that the space is formed between the respective mechanoluminescent columns. However, the present invention is not limited to this.

Figure 13:
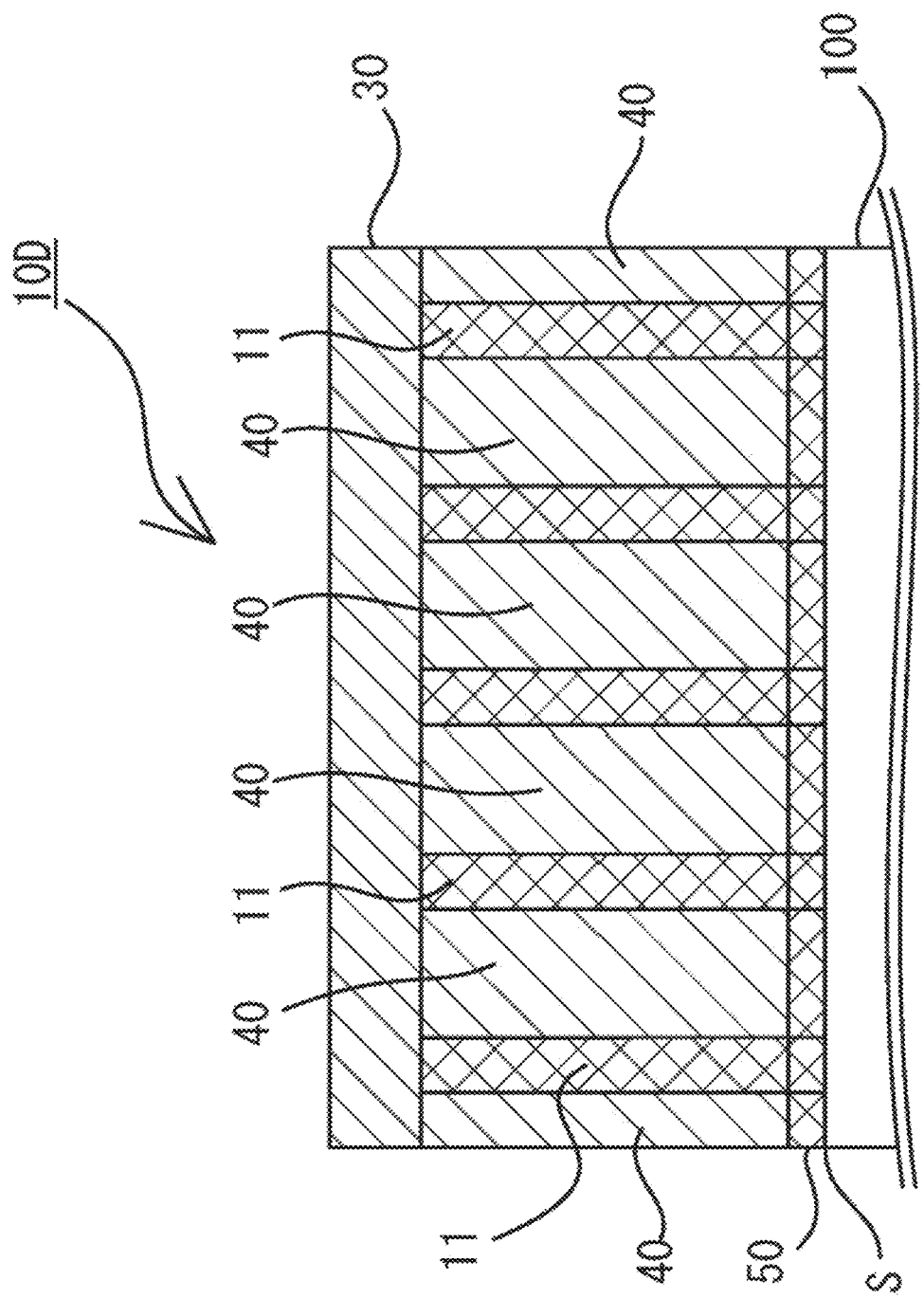
FIG. 13 is a schematic cross-sectional view of a light emitting structure according to a third embodiment.

For example, as shown in FIG. 13, the space between the respective mechanoluminescent columns 11 may be filled with a filler 40. FIG. 13 is a schematic cross-sectional view of a part of the light emitting structure according to the present embodiment.

The filler 40 is not particularly limited as long as it has a smaller rigidity than the mechanoluminescent column 11. Examples of the filler 40 include a silicone resin.

Since a light emitting structure 10D is thus configured, the mechanoluminescent columns 11 can be prevented from being destroyed or bent to such an extent that it cannot be restored when a load is applied.

The light emitting structure 10D can be fabricated by pouring a liquid, gel-like, or sol-like filler into a space between the mechanoluminescent columns 11, and drying and solidifying the filler. Furthermore, such a light emitting structure 10D can also be fabricated by disposing a porous material made of ceramics such as aluminum oxide or urethane foam between the respective mechanoluminescent columns 11.

Fourth Embodiment

In the third embodiment, the light emitting structure is configured to completely fill the space between the respective mechanoluminescent columns with the filler. However, the present invention is not limited thereto.

Figure 14:
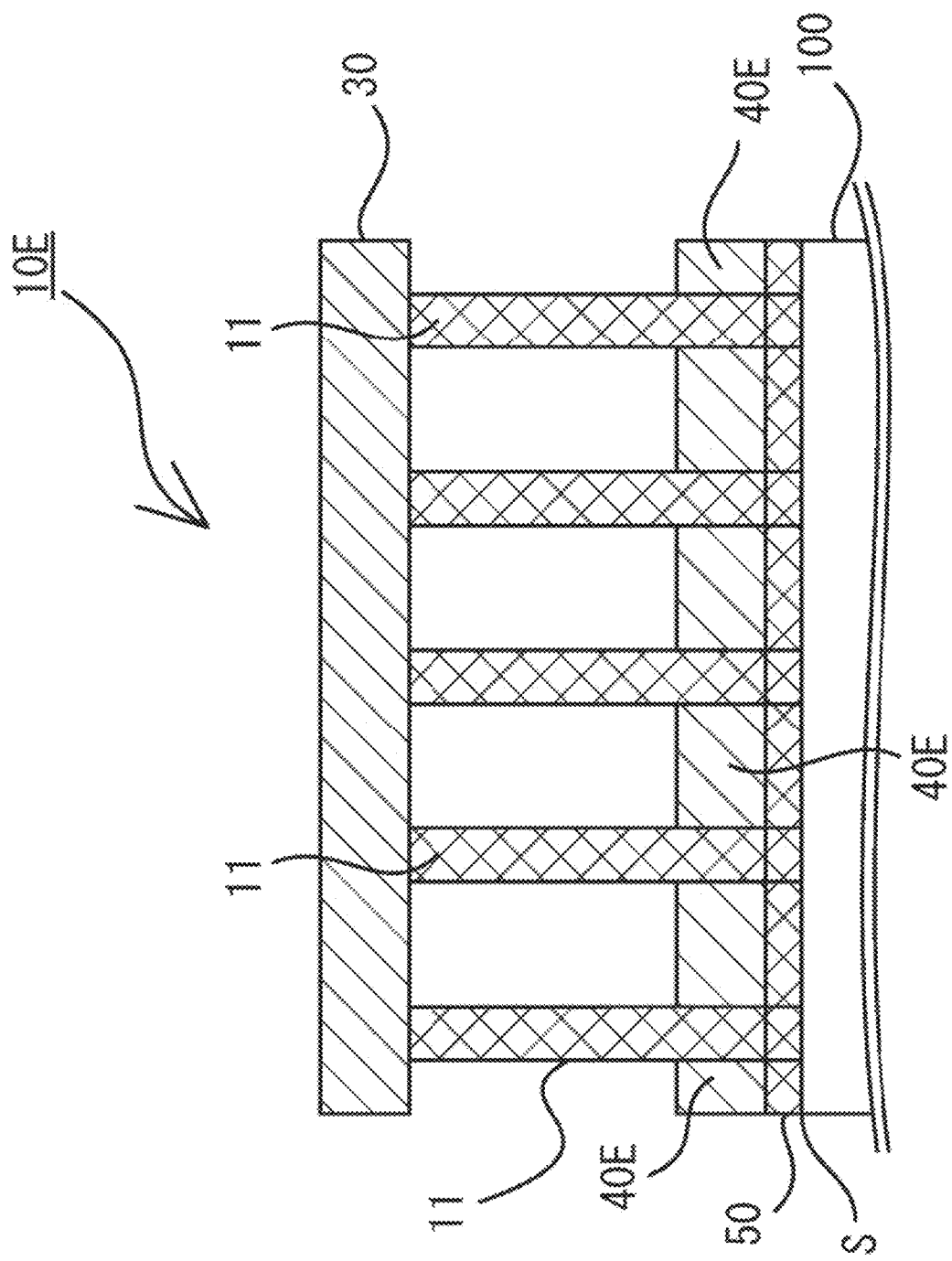
FIG. 14 is a schematic cross-sectional view of a light emitting structure according to a fourth embodiment.

For example, as shown in FIG. 14, at least one of the upper end portion and the lower end portion of the space between the respective mechanoluminescent columns 11 may be filled with a filler 40E. FIG. 14 is a schematic cross-sectional view of a part of the light emitting structure according to the present embodiment.

The filler 40E is not particularly limited as long as it is made of a material having the same as or larger rigidity than the mechanoluminescent column 11. Examples of the filler 40E include ceramics.

Since a light emitting structure 10E is thus configured, when a load is applied, bending or buckling of the lower end portions of the mechanoluminescent columns 11 that are in contact with the filler 40E is restricted by the filler 40E. Therefore, a larger bending or buckling occurs in a portion of the mechanoluminescent columns 11 other than those portions. As a result, the load distribution to be applied to the object 100 can be measured (detected) with a high sensitivity.

Fifth Embodiment

In the above-described embodiments, the contact portion is constituted by a plurality of mechanoluminescent columns. However, the present invention is not limited thereto.

Figure 15:
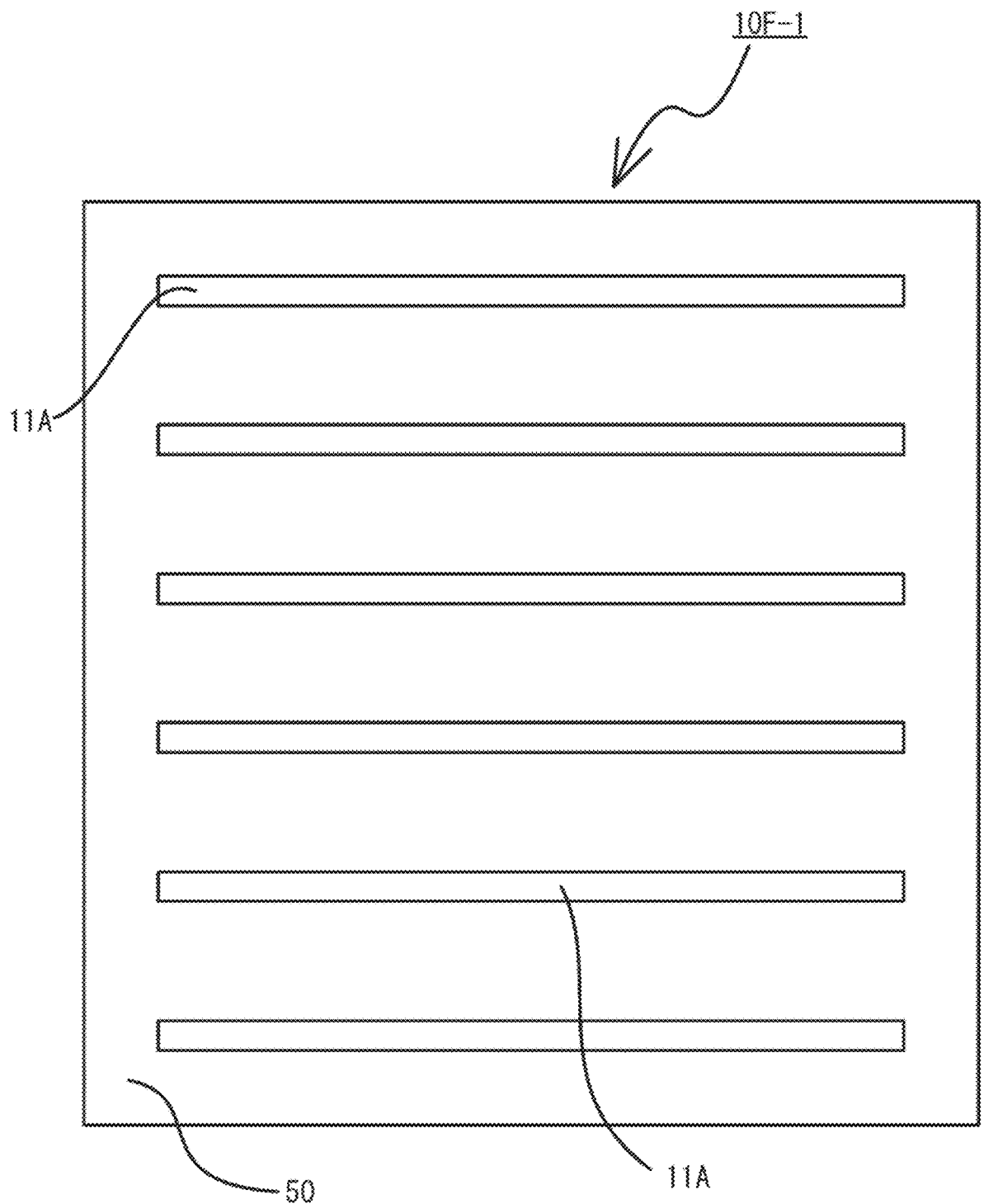
FIG. 15 is a schematic top view of an example of a light emitting structure according to a fifth embodiment, seen from a load object side.
Figure 16:
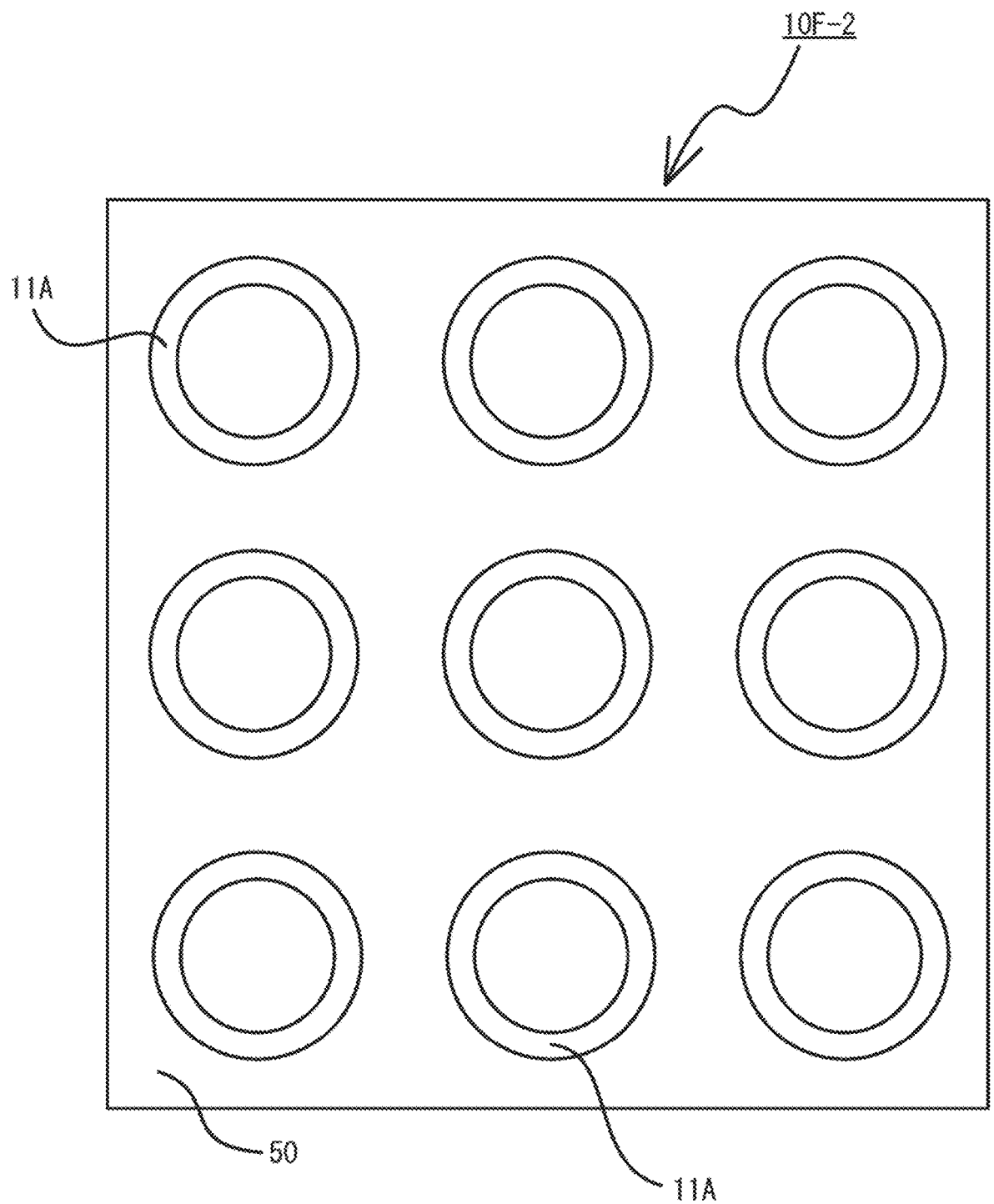
FIG. 16 is a schematic top view of an example of the light emitting structure according to the fifth embodiment, seen from the load object side.
Figure 17:
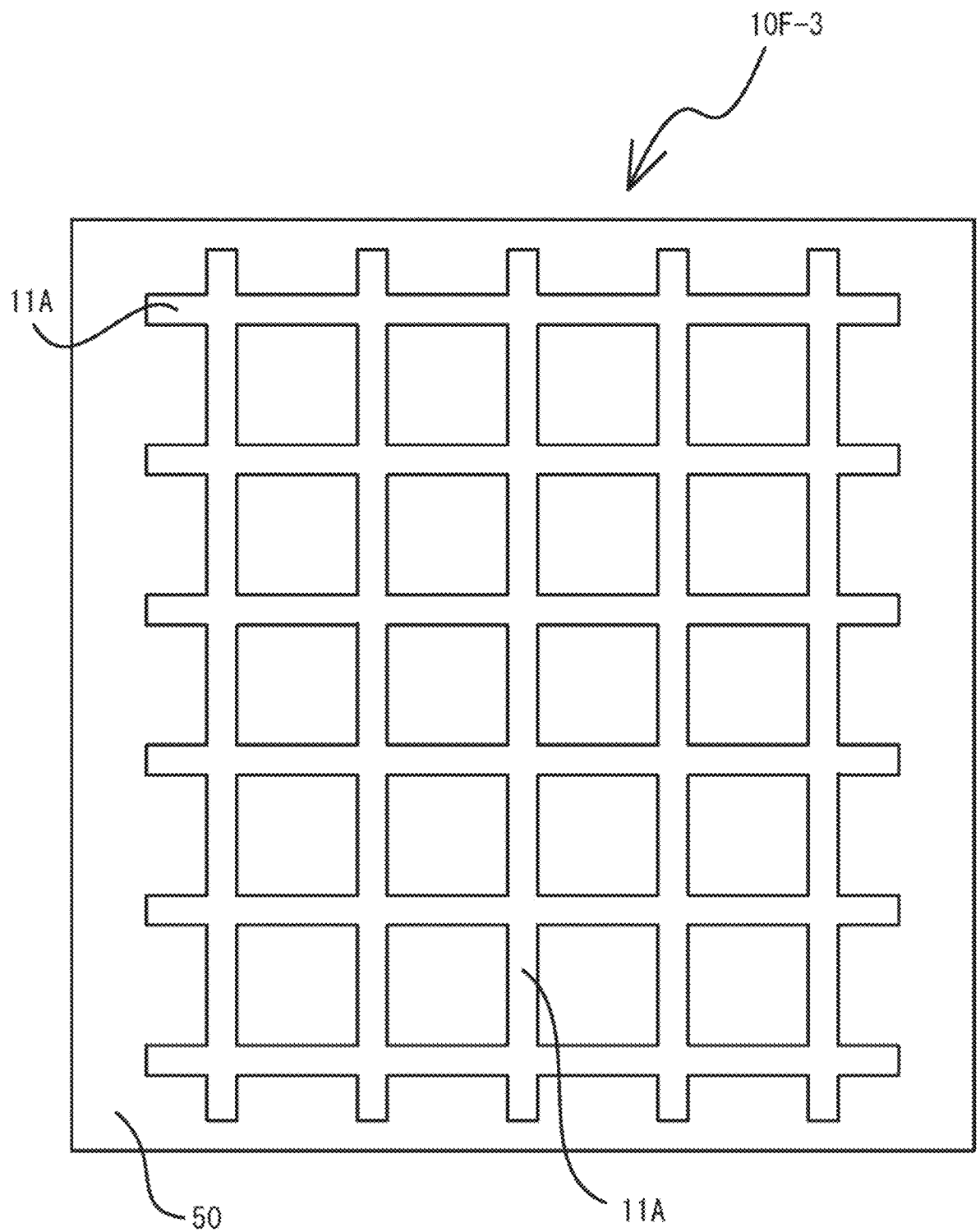
FIG. 17 is a schematic top view of an example of the light emitting structure according to the fifth embodiment, seen from the load object side.

For example, at least a part of the contact portion may be formed of a wall-shaped mechanoluminescent wall 11A. Specifically, as shown in FIGS. 15 to 17, at least a part of the contact portion may be linear, annular, or lattice-shaped as viewed from the load object side, or may be honeycomb-shaped or the like.

Even when the contact portion of the light emitting structure 10F-1, 10F-2, or 10F-3 is thus configured, the same advantageous effects as those of the above-described embodiments can be obtained.

Sixth Embodiment

In the above-described embodiments, the mechanoluminescent columns have a shape formed by extending the bottom surfaces in a perpendicular direction (shape where the bottom surfaces and the top surfaces have the same area). However, the present invention is not limited thereto.

Figure 18:
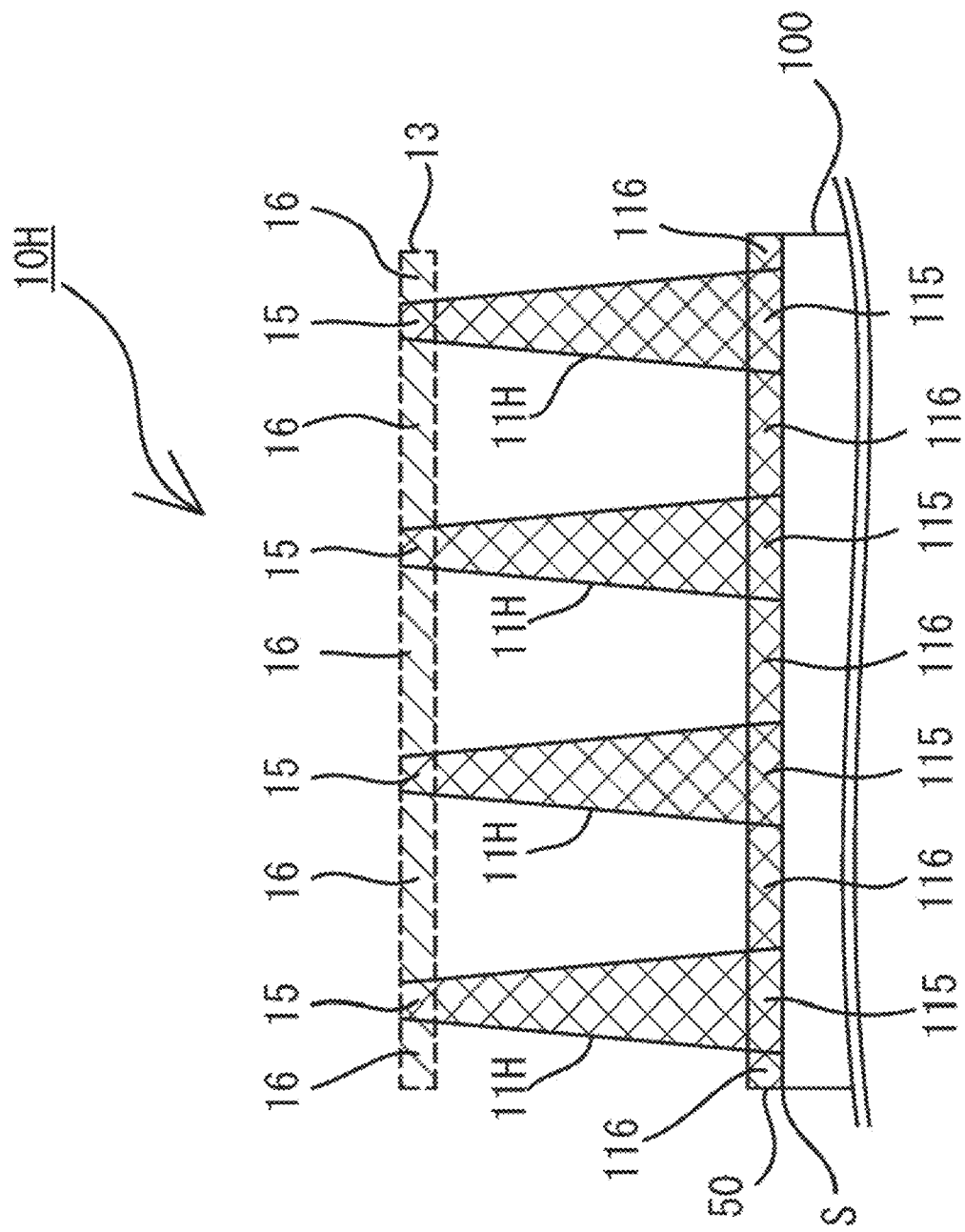
FIG. 18 is a schematic side view of a light emitting structure according to a sixth embodiment.

For example, as shown in FIG. 18, the mechanoluminescent columns may be shaped so that the bottom surfaces and the top surfaces have different areas. FIG. 18 shows a case where mechanoluminescent columns 11H of which the top surfaces have a smaller area than that of the bottom surfaces are used. In such a light emitting structure 10H, the ratio of the area of the contact regions 15 to the area of the support regions 115 is 1 or less, and the ratio of the volume of a mechanoluminescent column 11H to a value obtained by multiplying the area of the support region by the length of the mechanoluminescent column is also 1 or less.

Since the light emitting structure 10H is configured so that the ratio of the area of the contact regions 15 to the area of the support regions 115 is 1 or less, the load from the load object is received by the contact regions 15 of smaller area. The load applied to the object thus causes light emission of higher intensity, and the load applied to the object can be measured (detected) with a higher sensitivity by measuring the emission intensity. Moreover, since the support regions 115 are large, the mechanoluminescent columns 11H can be made to deform not near the support regions 115 but near the contact regions 15 when a load is applied. As a result, the light emitting structure becomes less likely to exfoliate from the object 100 because of repetitive deformation under repetitive load, and can emit light repeatedly even when a load is applied a plurality of times.

Since the light emitting structure 10H is configured so that the ratio of the volume of a mechanoluminescent column 11H to a value obtained by multiplying the area of the support region 115 by the length of the mechanoluminescent column is 1 or less, the mechanoluminescent column 11H has a smaller volume than that of a cube (imaginary contact portion) formed by extending the support region 115 in a perpendicular direction. This means the presence of a part (local part) where the horizontal cross-sectional area is smaller than that of the imaginary contact portion. The load acting on the light emitting structure 10H thus concentrates on the local parts of the mechanoluminescent columns 11H. As a result, the light emitting structure 10H emits light of higher intensity in response to the load applied to the object, and the load can be measured (detected) with a higher sensitivity by measuring the emission intensity.

Figure 19:
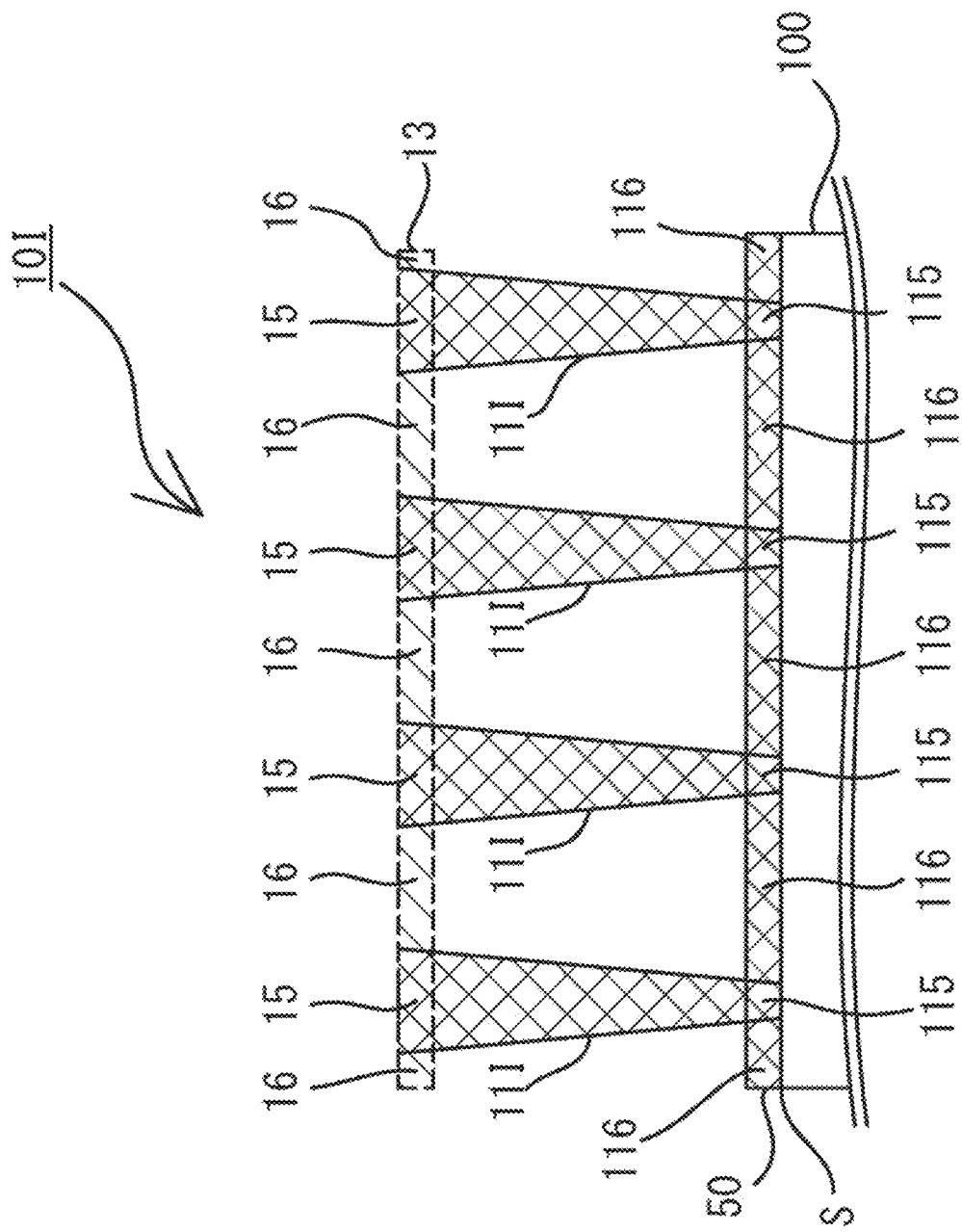
FIG. 19 is a schematic side view of a light emitting structure according to the sixth embodiment.

As shown in FIG. 19, mechanoluminescent columns 11I of which the top surfaces have a greater area than that of the bottom surfaces may be used. In such a light emitting structure 10I, the ratio of the area of the support regions 115 to the area of the contact regions 15 is 1 or less, and the ratio of the volume of a mechanoluminescent column 11I to a value obtained by multiplying the area of the contact region 15 by the length of the mechanoluminescent column 11H is also 1 or less.

Since the light emitting structure 10I is configured so that the ratio of the area of the support regions 115 to the area of the contact regions 15 is 1 or less, the area undergoing the load decreases as compared to a light emitting structure having no noncontact region 116. The pressure on the light emitting structure 10I thus increases, and the mechanoluminescent columns 11I may deform greatly (including elastic deformation, elastoplastic deformation, and plastic deformation) depending on the magnitude of the load. As a result, the light emitting structure 10I emits light of higher intensity in response to the load applied to the object, and the load can be measured (detected) with a higher sensitivity by measuring the emission intensity.

Since the light emitting structure 10I is configured so that the ratio of the volume of a mechanoluminescent column 11I to a value obtained by multiplying the area of the contact region 15 by the length (length in the perpendicular direction) of the mechanoluminescent column 11I is 1 or less, the mechanoluminescent column 11I has a smaller volume than that of a cube (imaginary contact portion) formed by extending the contact region 15 in a perpendicular direction. This means the presence of a part (local part) where the horizontal cross-sectional area is smaller than that of the imaginary contact portion. The load acting on the light emitting structure 10I thus concentrates more on the local parts of the mechanoluminescent columns 11I. As a result, the light emitting structure 10I emits light of higher intensity in response to the load applied to the object, and the load can be measured (detected) with a higher sensitivity by measuring the emission intensity.

Seventh Embodiment

In the above-described embodiments, the contact portions (mechanoluminescent columns 11) are configured by using mechanoluminescent columns having the same length (predetermined length h). However, the present invention is not limited thereto.

Figure 20A:
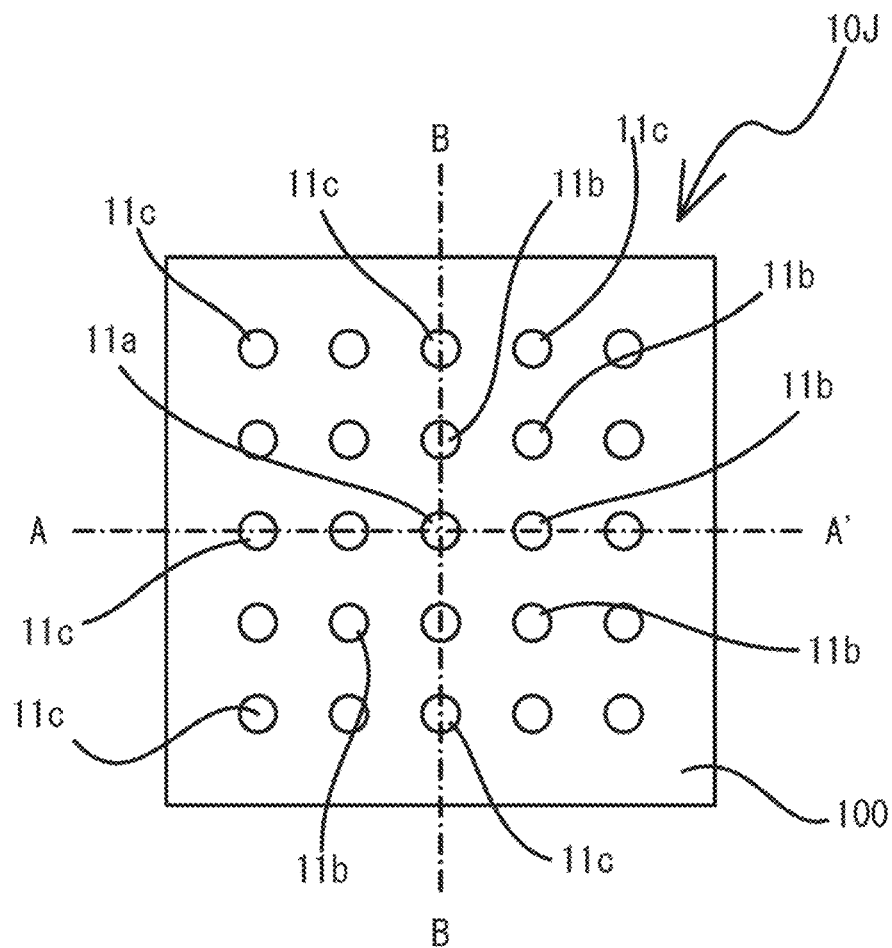
FIG. 20(a) is a schematic top view.
Figure 20B:
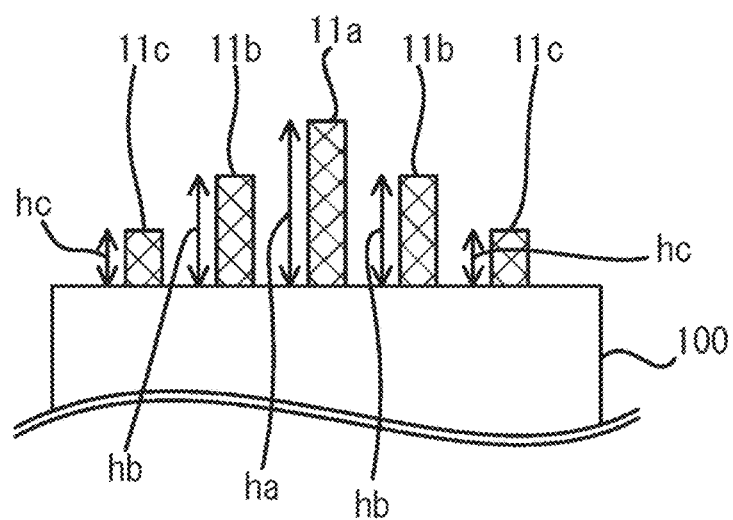
FIG. 20(b) is a schematic cross-sectional view.

For example, as shown in FIG. 20, a light emitting structure 10J may be configured by using mechanoluminescent columns of different lengths (a discrete length ha, a discrete length hb, and a discrete length hc). FIG. 20(a) is a schematic view of a contact surface seen from a load object side. FIG. 20(b) is a schematic cross-sectional view along plane A-A' shown in FIG. 20(a). A schematic cross-sectional view along plane B-B' shown in FIG. 20(a) is the same as FIG. 20(b).

As shown in the diagrams, a mechanoluminescent column 11a having the largest discrete length ha is located at the center. Mechanoluminescent columns 11b having the second largest discrete length hb are located around the mechanoluminescent column 11a. Mechanoluminescent columns 11c having the smallest discrete length hc are located around the mechanoluminescent columns 11b. In other words, the light emitting structure 10J is configured so that the mechanoluminescent columns are arranged to decrease in the discrete length from the center of the contact surface to the periphery of the contact surface.

Since the light emitting structure 10J is thus configured so that contact portions of the same heights are arranged within a two-dimensional plane, an initial load is supported in a linear or planar manner. This can increase light emission in response to the load from the load object. Supporting the initial load in a linear or planar manner can reduce the load on each of the contact portions and improve the durability of the contact portions.

Eighth Embodiment

In the seventh embodiment, the light emitting structure is configured so that the mechanoluminescent columns are arranged to decrease in the discrete length from the center of the contact surface to the periphery of the contact surface. However, the present invention is not limited thereto.

Figure 21A:
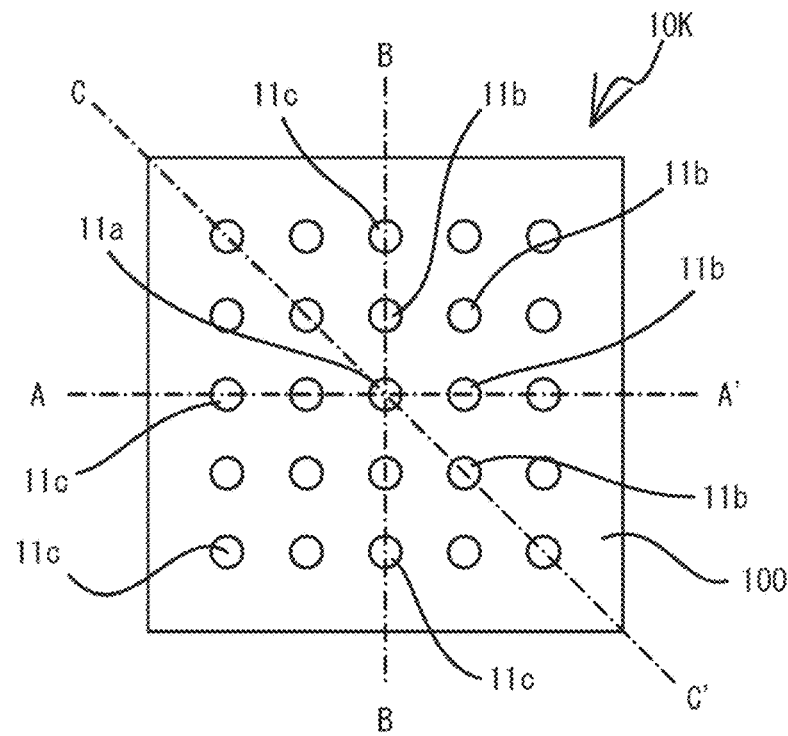
FIG. 21(a) is a schematic top view.
Figure 21B:
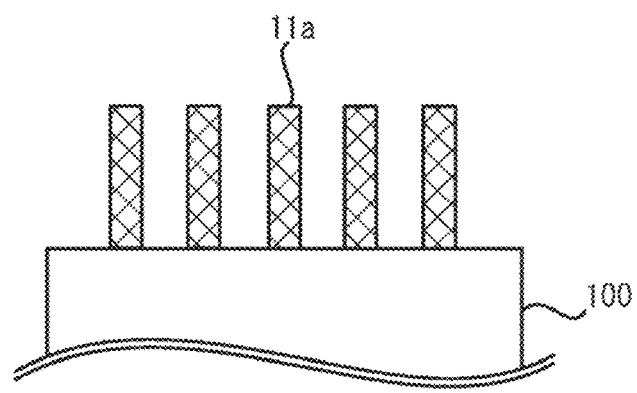
FIGS. 21(b) and 21(c) are schematic cross-sectional views.
Figure 21C:
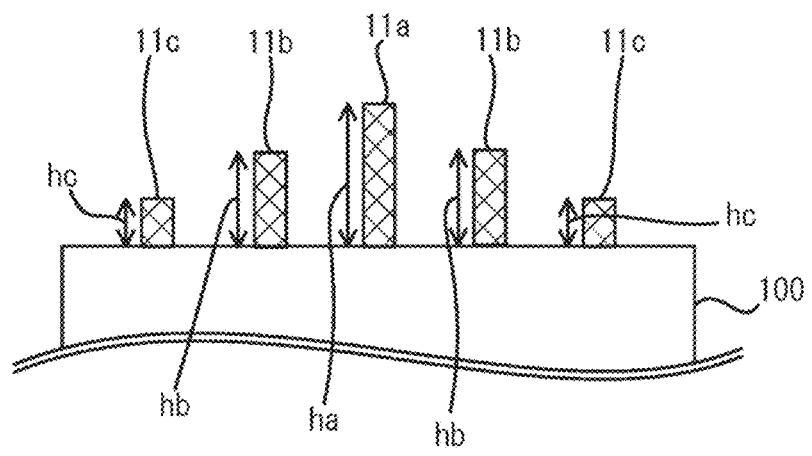

For example, as shown in FIG. 21, a light emitting structure 10K may be configured so that mechanoluminescent columns 11a, 11b, and 11c are arranged as follows: Mechanoluminescent columns 11a having the largest discrete length ha are arranged in two rows intersecting at the center of the contact surface. Mechanoluminescent columns 11b and 11c other than the mechanoluminescent columns 11a decrease in the discrete length from the center of the contact surface to the periphery of the contact surface. In other words, all the mechanoluminescent columns 11a located on line A-A' and line B-B' have the same largest discrete length ha. Like the seventh embodiment, the other mechanoluminescent columns 11b and 11c are arranged to decrease in the discrete length from the center of the contact surface to the periphery of the contact surface. Here, FIG. 21(a) is a schematic view of the contact surface seen from the load object side. FIG. 21(b) is a schematic cross-sectional view along plane A-A' shown in FIG. 21(a). FIG. 21(c) is a schematic cross-sectional view along plane C-C' shown in FIG. 21(a). A schematic cross-sectional view along plane B-B' shown in FIG. 21(a) is the same as FIG. 21(b).

Since the light emitting structure 10K is thus configured, an initial load is supported in a linear or planar manner, whereby light emission in response to the load from the load object can be increased. Supporting the initial load in a linear or planar manner can reduce the load on each of the contact portions and improve the durability of the contact portions.

Ninth Embodiment

In the above-described embodiments, the light emitting structure is used to constitute a load distribution measuring device. However, the present invention is not limited thereto.

A light emitting display or a haptic display for detecting contact of a load object may be constituted.

Specifically, a light emitting display or haptic display can include a display unit having a predetermined shape and the above-described light emitting structure that is disposed on a contact surface of the display unit with a load object or human.

As described above, the light emitting structure emits light when being in contact with a load object. The light emitting display or haptic display can thus display the shape of the contact surface in contact with the load object or human on the display unit. In other words, the contact of the load object or human with the display unit can be detected by observing the state of light emission of the display unit.

Note that the display unit is not limited to any particular shape, and may have a rectangular, spherical, spheroidal, or indefinite shape.

Tenth Embodiment

In the above-described embodiments, the light emitting structures having the above-described configurations are formed. However, the present invention is not limited thereto.

For example, a light emitting structure may be formed in which a light emitting layer containing the mechanoluminescent material is formed on at least a part of the surface (excluding the surface on the support surface side) and a material layer formed on the light emitting layer are provided. The Young's modulus of the material layer is preferably larger than the Young's modulus of the light emitting layer, and the thickness of the material layer is preferably ⅓ or less of the thickness of the light emitting layer.

Here, the material constituting the material layer is not particularly limited as long as the material has a larger Young's modulus than that of the light emitting layer. The material is preferably transparent or translucent. The material layer can be formed by coating a resin on the light emitting layer and then drying the resin, or other treatments.

Since the light emitting structure is thus configured, the Young's modulus of the light emitting structure can be freely controlled by laminating a material layer, having a Young's modulus higher than that of the light emitting layer, on the light emitting layer. Thus, a light emitting structure having an optimum Young's modulus or rigidity corresponding to the magnitude of the load applied from the load object can be constructed. As a result, the light emitting structure of the present embodiment emits light with a higher intensity by a load applied to an object, and can measure (detect) the load with a higher sensitivity by measuring the emission intensity.

Other Embodiments

In the first embodiment, the mechanoluminescent columns are uniformly arranged to have a predetermined distance from the adjacent mechanoluminescent columns. However, the present invention is not limited thereto. The arrangement of the respective mechanoluminescent columns is not particularly limited, and the respective mechanoluminescent columns may be arranged irregularly, or may be arranged so as to form a predetermined pattern such as a spiral shape or a multi-circle shape when viewed from the load object side (upper side). Even when the mechanoluminescent columns are thus arranged on the object, the same advantageous effects as those of the above-described embodiments can be obtained.

Furthermore, in the above-described embodiments, the load is applied via the load object. However, the present invention is not limited thereto.

Even when a load is applied using a gas such as air or a liquid such as water, for example, a sound pressure (a compressional wave) such as acoustic waves or ultrasonic waves received on the surface of an object, or fluid ultrasonic waves flowing on the surface of an object, acoustic waves, or a pressure of a fluid such as water is adopted, the light emitting structure can emit light by the load in the same manner as that in the above-described embodiments, so that the load distribution of the load object can be measured by measuring the emission distribution therefrom.

In the above-described embodiments, the heights of the respective mechanoluminescent columns are the same or substantially the same. However, the present invention is not limited thereto. Even when the heights of the respective mechanoluminescent columns are different from one another, at least the presence or absence of contact can be detected by light emission.

The light emitting structure of the first embodiment has the mechanoluminescent layer and the mechanoluminescent columns. However, the present invention is not limited to this configuration. For example, a load sensor (light emitting structure) may be configured with only a plurality of mechanoluminescent columns. That is, the light emitting structure may be configured such that a mechanoluminescent film or a mechanoluminescent wall is directly provided on the object without providing the mechanoluminescent layer. Such a light emitting structure can be fabricated by attaching respective mechanoluminescent columns onto an object, respectively. Even when the light emitting structure is thus configured, the same advantageous effects as those of the above-described embodiments can be obtained.

REFERENCE SIGNS LIST 10, 10A to 10K light emitting structure
11, 11H, 11I, 11a, 11b, 11c contact portion (mechanoluminescent column)
11A mechanoluminescent wall
13 contact surface
15 contact region
16 noncontact region
18 bending portion
30 protective member
40, 40E filler
50 mechanoluminescent layer
100 object
110 support region
115 support region
116 nonsupport region
200 load object
11aa columnar protrusion (columnar portion)
11bb mechanoluminescent layer

The invention claimed is:

1. A light emitting structure configured to emit light in response to a load applied to an object from a load object, wherein:
the light emitting structure
is disposed on a support surface of the object, and
includes a contact portion that is formed to have a predetermined length from a surface of the support surface in a direction perpendicular to a surface of the object;
the contact portion contains a mechanoluminescent material on at least a part of a surface thereof;
a light emitting layer containing the mechanoluminescent material is disposed on a surface thereof;
a material layer is disposed on the light emitting layer; and
the material layer has a Young's modulus larger than that of the light emitting layer.

2. The light emitting structure according to claim 1, wherein at least a part of a cross-section of the contact portion cut along a plane parallel to the support surface has a substantially rectangular shape, a substantially circular shape, a substantially triangular shape, a substantially semi-circular shape, or a substantially semi-elliptical shape.

3. The light emitting structure according to claim 1, wherein at least a part of the contact portion is a wall-like part.

4. The light emitting structure according to claim 1, wherein the contact surface where the contact portion makes contact with the surface of the load object and at least part of an inside of the contact portion are substantially mash-like in shape.

5. A light emitting structure configured to emit light in response to a load applied to an object from a load object, wherein:
the light emitting structure
is disposed on a support surface of the object, and
includes a contact portion that is formed to have a predetermined length from a surface of the support surface in a direction perpendicular to a surface of the object;
the contact portion contains a mechanoluminescent material on at least a part of a surface thereof; and
the contact portion includes a columnar part having a plurality of columnar portions.

6. The light emitting structure according to claim 5, wherein:
the columnar portion includes a columnar member and a layer containing the mechanoluminescent material at least on a part of a surface of the columnar member; and
the columnar member has a flexural modulus of 3 GPa or less.

7. The light emitting structure according to claim 5, wherein the plurality of columnar portions are uniformly arranged on the support surface at a predetermined distance.

8. The light emitting structure according to claim 7, wherein the predetermined distance satisfies the following expression:

$$w > \delta,$$

where, in the expression, w is the predetermined distance, and δ is an amount of deflection of the columnar part when a load is applied to the columnar part.

9. The light emitting structure according to claim 5, wherein a shape of the columnar part to make contact with the surface of the load object is conical, substantially hemispherical, or substantially spherical.

10. The light emitting structure according to claim 5, wherein the contact portion has a length which is a plurality of different discrete lengths.

11. The light emitting structure according to claim 10, wherein the discrete lengths decrease from a center of the contact surface to a periphery of the contact surface.

12. The light emitting structure according to claim 5, wherein a protective member is disposed on a part or all of a load object-side surface of the contact portion.

13. A load measuring device for measuring a magnitude of a load applied to the object from a load object on a basis of an emission intensity,
the load measuring device comprising the light emitting structure according to claim 5.

14. A load measuring method for measuring a load applied to an object from a load object on the basis of an emission intensity, the load distribution measuring method comprising the steps of:
attaching the load measuring device according to claim 13 to a surface of the object; and applying a load to the object from the load object via the load measuring device.

\* \* \* \* \*